(12) United States Patent
Choi et al.

(10) Patent No.: US 9,742,005 B2
(45) Date of Patent: Aug. 22, 2017

(54) COMPOSITE CATHODE ACTIVE MATERIAL, CATHODE AND LITHIUM BATTERY CONTAINING THE COMPOSITE CATHODE ACTIVE MATERIAL

(71) Applicants: Samsung Electronics Co., Ltd., Suwon-si, Gyeonggi-do (KR); SAMSUNG FINE CHEMICALS CO., LTD., Ulsan (KR); Samsung SDI Co., Ltd., Yongin-si, Gyeonggi-do (KR)

(72) Inventors: Byungjin Choi, Seoul (KR); Donghan Kim, Chungcheongnam-do (KR); Ryounghee Kim, Yongin-si (KR); Jinhwan Park, Seoul (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 69 days.

(21) Appl. No.: 14/806,903

(22) Filed: Jul. 23, 2015

(65) Prior Publication Data

US 2016/0190550 A1   Jun. 30, 2016

(30) Foreign Application Priority Data

Dec. 29, 2014   (KR) .................... 10-2014-0192557

(51) Int. Cl.
*C01G 45/12* (2006.01)
*C01G 53/00* (2006.01)
(Continued)

(52) U.S. Cl.
CPC .......... *H01M 4/364* (2013.01); *C01G 45/125* (2013.01); *C01G 45/1228* (2013.01); (Continued)

(58) Field of Classification Search
CPC ...... H01M 4/364; H01M 4/485; H01M 4/505; H01M 4/525; H01M 10/052;
(Continued)

(56) References Cited

U.S. PATENT DOCUMENTS 3,939,008 A   2/1976   Longo et al.
6,416,902 B1   7/2002   Miyasaka
(Continued)

FOREIGN PATENT DOCUMENTS

KR   1020070061861 A   6/2007
KR   1020130055441 A   5/2013

OTHER PUBLICATIONS

Wiley et al. "Non-Noble Metal Fuel Cell Catalysts". Mar. 21, 2014. Total pp. 3.*
(Continued)

*Primary Examiner* — Harold Pyon
*Assistant Examiner* — Danny N Kang
(74) *Attorney, Agent, or Firm* — Cantor Colburn LLP

(57) ABSTRACT

A composite cathode active material including: a first metal oxide having a layered crystal structure; and a second metal oxide having a perovskite crystal structure, wherein the second metal oxide includes a first metal and a second metal that are each 12-fold cubooctahedrally coordinated to oxygen. Also a cathode including the composite cathode material and a lithium battery containing the cathode.

17 Claims, 11 Drawing Sheets

(51) Int. Cl.
*H01M 4/36* (2006.01)
*H01M 4/485* (2010.01)
*H01M 4/505* (2010.01)
*H01M 4/525* (2010.01)
*H01M 4/02* (2006.01)
*H01M 10/052* (2010.01)

(52) U.S. Cl.
CPC ......... *C01G 45/1264* (2013.01); *C01G 53/50* (2013.01); *H01M 4/485* (2013.01); *H01M 4/505* (2013.01); *H01M 4/525* (2013.01); *C01P 2002/34* (2013.01); *C01P 2002/72* (2013.01); *C01P 2004/82* (2013.01); *C01P 2006/40* (2013.01); *H01M 10/052* (2013.01); *H01M 2004/028* (2013.01)

(58) Field of Classification Search
CPC ........... H01M 2004/028; C01G 45/125; C01G 45/1264; C01G 53/50; C01P 2002/34; C01P 2004/82; C01P 2006/40
USPC ....................................................... 252/500
See application file for complete search history.

(56) References Cited

U.S. PATENT DOCUMENTS

| | | |
|---|---|---|
| 6,653,021 B2 | 11/2003 | Kweon et al. |
| 8,795,902 B2 | 8/2014 | Yada et al. |
| 2012/0202128 A1* | 8/2012 | Nakanishi ........... H01M 4/8657 429/408 |
| 2013/0130103 A1* | 5/2013 | Kim ..................... H01M 4/364 429/211 |

OTHER PUBLICATIONS

Rao et al., "Crystal structure and magnetoresistance of Na-doped LaMnO3", J. Phys.Condens. Matter, vol. 11, 1999, pp. 1523-1528.
Shivakumara et al., "Rapid Synthesis of Ferromagnetice La1-x NaxMnO3 (0.00<x<0.25) by the Solution Combustion Method", J. Am. Ceram. Soc., vol. 90(12), 2007, pp. 3852-3858.

* cited by examiner

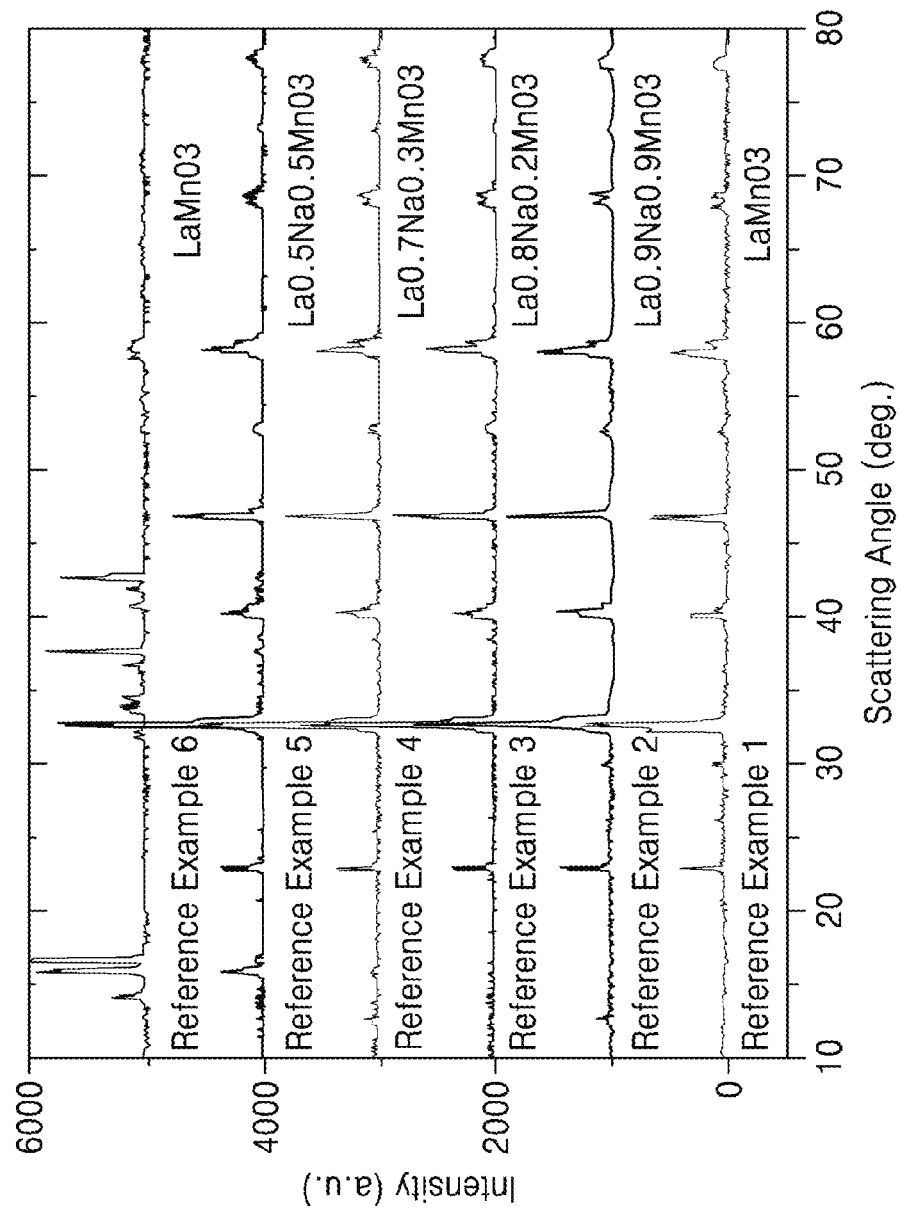

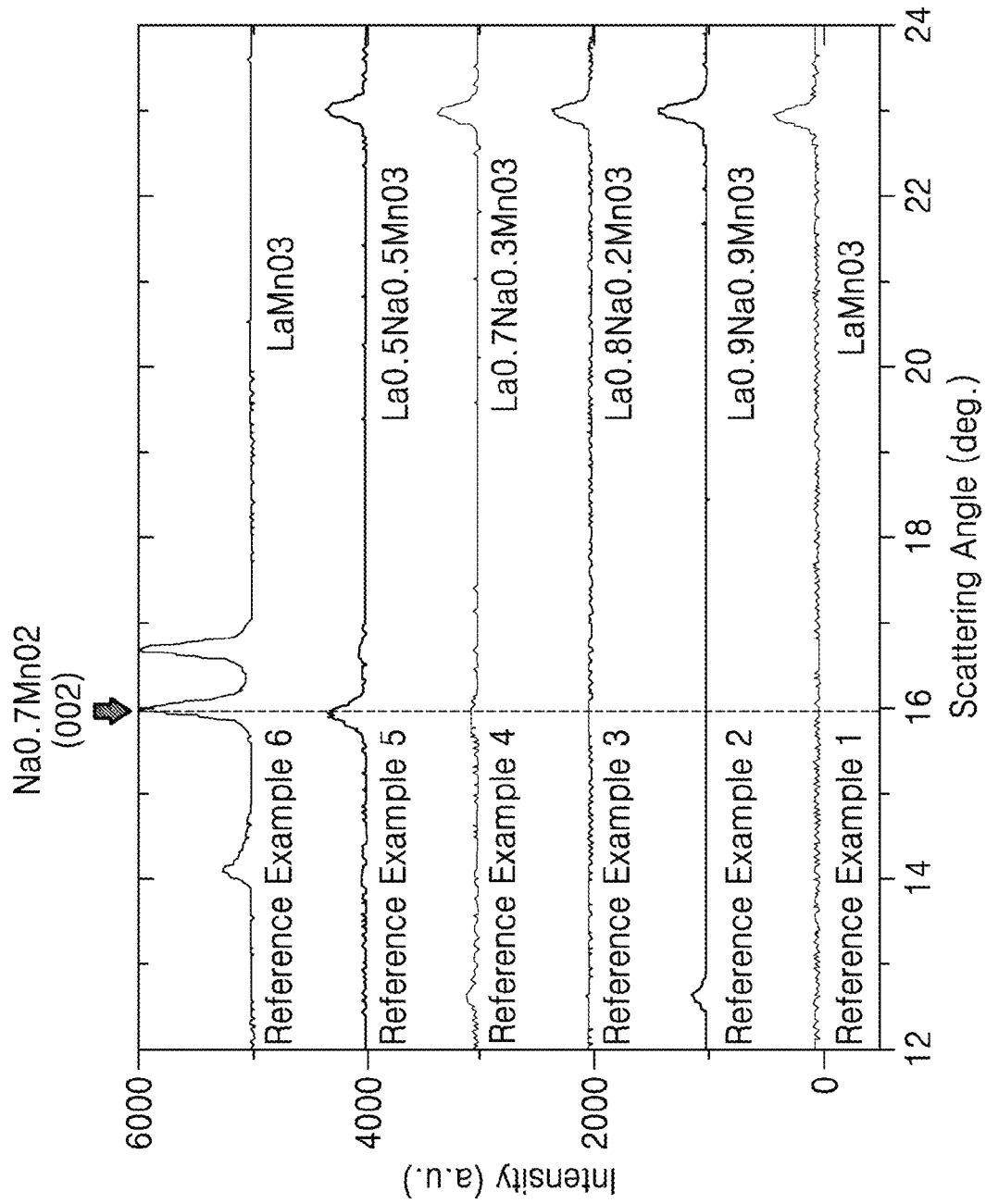

COMPOSITE CATHODE ACTIVE MATERIAL, CATHODE AND LITHIUM BATTERY CONTAINING THE COMPOSITE CATHODE ACTIVE MATERIAL

CROSS-REFERENCE TO RELATED APPLICATION

This application claims priority to and the benefit of Korean Patent Application No. 10-2014-0192557, filed on Dec. 29, 2014, in the Korean Intellectual Property Office, and all the benefits accruing therefrom under 35 U.S.C. §119, the content of which is incorporated herein in its entirety by reference.

BACKGROUND

1. Field

The present disclosure relates to a composite cathode active material and a cathode and a lithium battery including the composite cathode active material.

2. Description of the Related Art

Lithium batteries have been used as a driving power supply for vehicles as well as for portable electronic devices, and thus efforts have been made to improve a capacity of the lithium battery. Also, as various devices have become more complex and perform multiple functions, the demand for increasing a voltage of a lithium battery as an energy source of a device have increased as well as reducing a size and a weight of the lithium battery.

In order to manufacture such lithium battery, a composite cathode active material with reduced decrease in its voltage characteristics while having excellent lifetime characteristics and capacity characteristics after repeated charging and discharging of the battery is needed.

SUMMARY

Provided is a composite cathode active material that is structurally stable while charging/discharging of a battery.

Provided is a cathode including the composite cathode active material.

Provided is a lithium battery containing the cathode.

Additional aspects will be set forth in part in the description which follows and, in part, will be apparent from the description.

According to an aspect, a composite cathode active material includes: a first metal oxide having a layered crystal structure; and a second metal oxide having a perovskite crystal structure, wherein the second metal oxide includes a first metal and a second metal that are each 12-fold cuboctahedrally coordinated to oxygen.

According to an aspect, a cathode includes the composite cathode active material.

According to an aspect, a lithium battery includes the cathode.

BRIEF DESCRIPTION OF THE DRAWINGS

These and/or other aspects will become apparent and more readily appreciated from the following description of the exemplary embodiments, taken in conjunction with the accompanying drawings in which:

FIGS. 2A to 2C are each a graph of intensity (arbitrary units, a.u.) versus scattering angle (degrees two-theta, deg.) and are X-ray diffraction (XRD) spectra of metal oxides having a perovskite crystal structure prepared in Reference Examples 1 to 6;

DETAILED DESCRIPTION

Figure 1:
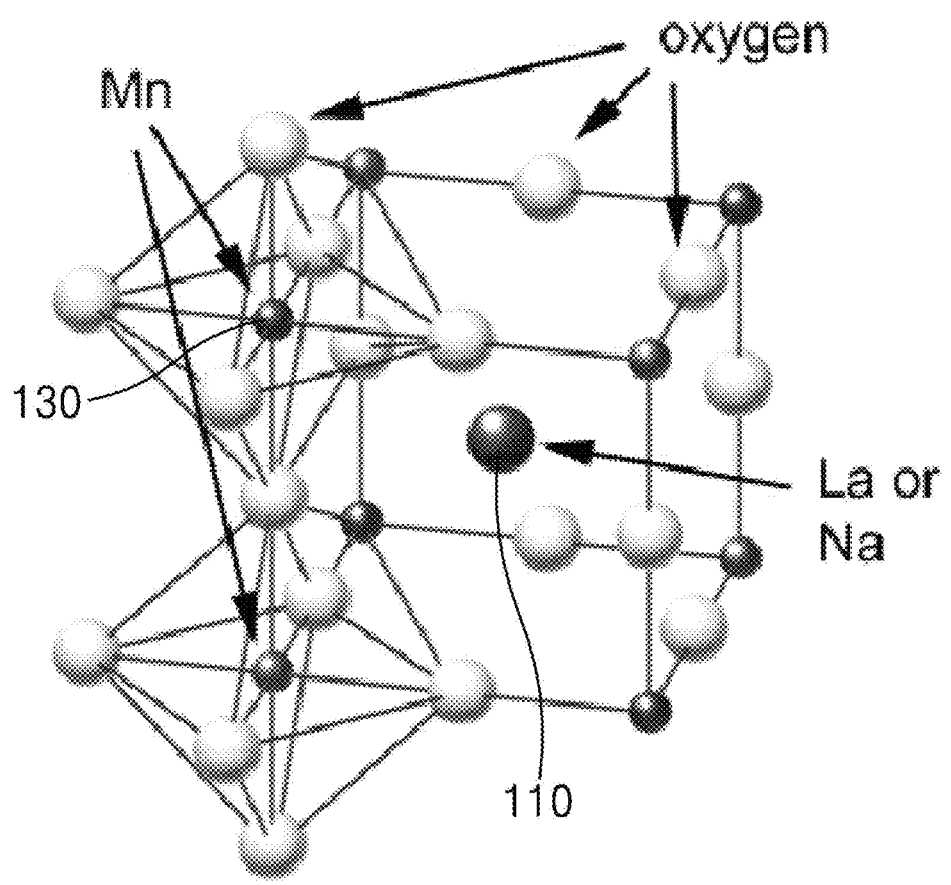
FIG. 1 is a schematic view of a perovskite crystal structure of a metal oxide according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Rare earth" means the fifteen lanthanide elements, i.e., atomic numbers 57 to 71, plus scandium and yttrium.

The "lanthanide elements" means the chemical elements with atomic numbers 57 to 71.

Hereinafter, according to an embodiment, a composite cathode active material, a cathode including the composite cathode active material, a lithium battery including the cathode, and a method of preparing the composite cathode active material will be disclosed in further detail.

A lithium transition metal oxide (e.g., of the formula LiMeO$_2$) having a layered structure forms an ion-binding crystal structure and thus has a compact crystalline structure. Oxygen ions having the largest ionic diameter form a compact layer, and lithium ions and transition metal ions fill the empty space between the oxygen ions, and thus a packing density of the crystal structure increases. A transition metal oxide layer, which includes a transition metal and oxygen, and an oxygen octahedral layer, which surrounds lithium ions, are arranged alternately. While not wanting to be bound by theory, it is understood that a strong ionic bond is formed within the transition metal oxide layer (e.g., of the formula MeO$_2$), and since coulomb repulsive forces are present between the transition metal oxide layers, lithium ions may be intercalated/deintercalated. Further, since the lithium ions can diffuse along a 2-dimensional plane, an ion conductivity of the lithium transition metal oxide having a layered structure is high, but a discharge capacity of the transition metal oxide having a layered structure is as low as about 150 milliampere hours per gram (mAh/g).

When a part of a transition metal site in the lithium transition metal oxide having a layered structure is substituted with lithium, a lithium transition metal oxide having a layer-layer composite structure, e.g., of the formula (Li$_2$MO$_3$.LiMeO$_2$) including excess lithium can be obtained and it may have a high capacity of 200 mAh/g or greater.

The lithium transition metal oxide having a composite structure forms a structure of the formula uLi$_2$MnO$_3$.(1-u)MO$_2$ (wherein 0<u<1) by deintercalation of lithium from LiMeO$_2$ during initial charging until a voltage of 4.4 V and forms a structure of the formula (u-δ)Li$_2$MnO$_3$.δMnO$_2$.(1-u)MO$_2$ (wherein 0<u<1, 0<δ<1, and u+δ=1) with Li$_2$O at a voltage of 4.4 V or higher. That is, as shown in Reaction Scheme 1, when charged to a voltage of 4.4 V or higher, Li$_2$O is formed by generation of oxygen and deintercalation of lithium from Li$_2$MnO$_3$ at the same time, and a reaction producing MnO$_2$ proceeds. As shown in Reaction Scheme 2, Li$_2$O does not participate in the reaction during discharging, and thus Li$_2$MnO$_3$ may not be recovered.

Reaction Scheme 1

Li$_2$MnO$_3$ ⟶ νLi$_2$O + νMnO$_2$ + (1-ν)Li$_2$MnO$_3$

Reaction Scheme 2

Li + MnO$_2$ ⟶ LiMnO$_2$

In Reaction Scheme 1, 0<ν<1.

That is, when a cut-off voltage during charging increases to 4.4 volts (V) or greater, Li$_2$MnO$_3$ is decomposed, and the Li$_2$MnO$_3$ does not recover during discharging, and thus a remaining amount of Li$_2$MnO$_3$ in the composite cathode active material decreases. Accordingly, due to the decrease in the remaining amount of Li$_2$MnO$_3$ that stabilizes a structure when a cut-off voltage is increased, a structural stability of the layer-layer composite cathode active material decreases, and thus as a result, a charging/discharging voltage may decrease. Also, in the initial charging/discharging reaction, 2 mole equivalents (eq.) of lithium with respect to 1 mole eq. of manganese are deintercalated during charge, and only 1 mole eq. of lithium is intercalated during discharge. Thus, a charging/discharging efficiency may decrease, and lifetime characteristics may be deteriorated.

On the other hand, the composite cathode active material according to an embodiment includes a first metal oxide having a layered crystal structure; and a second metal oxide having a perovskite crystal structure, wherein the second metal oxide includes a first metal and a second metal that are each 12-fold cuboctahedrally coordinated to oxygen. As shown in FIG. 1, in the perovskite crystal structure, the first metal and the second metal are located in metal site 110 positioned in the center of a hexahedron cube including 12 oxygen atoms and coordinated with 12 oxygen atoms. For example, the first metal and the second metal are placed at metal site 110 where La or Na in FIG. 1 are located. Since the second metal is introduced, a hole density increases, and thus a electron conductivity increases.

The composite cathode active material simultaneously includes the first metal oxide having a layered crystal structure and the second metal oxide having a perovskite crystal structure. The perovskite crystal structure has a high stability and a lithium ion conductivity, and has a similar crystal structure with the layered crystal structure. Thus, by including the second metal oxide, a structural stability of the first metal oxide having a layered crystal structure may be improved while not deteriorating a conductivity of lithium ions in the composite cathode active material. That is, the second metal oxide may act as a stabilizer phase.

Also, by employing metals of at least two different types in metal sites where 12 oxygen atoms are placed in the perovskite crystal structure of the second metal oxide, a structural stability of the perovskite crystal structure may further improve. For example, when the metals of at least two different types are employed, e.g., doped, in the perovskite crystal structure an electron conductivity and/or an ion conductivity may be further improved. For example, when Na is employed in the perovskite crystal structure including La, an electron conductivity of the metal oxide may increase. Also, when the metals of at least two different types are employed, e.g., doped, an ion binding force is enhanced, and thus a pillar layer including oxygen atoms in the perovskite crystal structure may be further stabilized.

In this regard, when the composite cathode active material includes the second metal oxide, a structural stability and an electron conductivity of the composite cathode active material improve, and thus a charging/discharging efficiency and lifetime characteristics improve and a voltage drop may be suppressed.

The first metal in the composite cathode active material may be selected from elements belonging to Group 2 and Group 3 of the Periodic Table. For example, the first metal may be selected from La, Sr, Ba, Ce, Y, and Sc.

The second metal in the composite cathode active material may be selected from elements belonging to Group 1, Group 2, and Group 11 of the Periodic Table. For example, the second metal may be selected from Li, Na, Ca, Ag, K, Mg, and Cu.

In the composite cathode active material, the second metal oxide may further include a third metal that is disposed in a third metal site 130 that is 6-fold octahedrally coordinated to oxygen atoms. As shown in FIG. 1, in the perovskite crystal structure, the third metal site 130 is 6-fold coordinated to oxygen atoms and is located in the center of an octahedron including 6 oxygen atoms in the edges of the octahedron. In the composite cathode active material, the third metal site 130 may be a metal site where Mn is located in FIG. 1. For example, the third metal may be selected from elements(metals) belonging to Group 4, Group 5, Group 6, Group 7, Group 8, Group 9, Group 10, Group 11, and Groups 12 to 14 of the Periodic Table. For example, the third metal may be selected from Mn, V, Cr, Fe, Co, Ni, Zr, Ti, Cu, Nb, Ta, Ru, W, and Sn.

For example, in the composite cathode active material, the second metal oxide may have a composition represented by Formula 1:

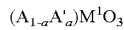  Formula 1

In Formula 1,
A is a metal selected from La, Sr, Ba, Ce, Y, and Sc, A' is a metal selected from Li, Na, Ca, Ag, K, Mg, and Cu, and $M^1$ is at least one metal selected from Mn, V, Cr, Fe, Co, Ni, Zr, Ti, Mg, Cu, Nb, Ta, Ru, W, and Sn, wherein $0<a\leq0.3$. For example, in Formula 1, $0<a\leq0.12$.

In particular, the second metal oxide may be at least one metal oxide selected from $(La_{1-a}, Na_a)MnO_3$, $(La_{1-a}, Li_a)MnO_3$, $(Ba_{1-a}Na_a)TiO_3$, $(Ba_{1-a}Li_a)TiO_3$, $(La_{1-a}, Na_a)NiO_3$, $(La_{1-a}, Li_a)NiO_3$, $(La_{1-a}, Na_a)CoO_3$, $(La_{1-a}, Li_a)CoO_3$, $(La_{1-a}, Na_a)MgO_3$, $(La_{1-a}, Li_a)MgO_3$, $(La_{1-a}, Na_a)FeO_3$, $(La_{1-a}, Li_a)FeO_3$, $Na_a)NiO_3$, $Li_a)NiO_3$, $Na_a)CoO_3$, $(Sr_{1-a}, Li_a)CoO_3$, $(Sr_{1-a}, Na_a)MnO_3$, $(Sr_{1-a}, Li_a)MnO_3$, $(Sr_{1-a}, Na_a)MgO_3$, $(Sr_{1-a}, Li_a)MgO_3$, $(Sr_{1-a}, Na_a)FeO_3$, $(Sr_{1-a}, Li_a)FeO_3$, $(Ba_{1-a}, Na_a)NiO_3$, $(Ba_{1-a}, Li_a)NiO_3$, $(Ba_{1-a}, Na_a)CoO_3$, $(Ba_{1-a}, Li_a)CoO_3$, $(Ba_{1-a}, Na_a)MnO_3$, $(Ba_{1-a}, Li_a)MnO_3$, $(Ba_{1-a}, Na_a)MgO_3$, $(Ba_{1-a}, Li_a)MgO_3$, $(Ba_{1-a}, Na_a)FeO_3$, $(Ba_{1-a}, (Ca_{1-a}, Li_a)FeO_3$, $(Ca_{1-a}, Na_a)NiO_3$, $Li_a)NiO_3$, $Na_a)CoO_3$, $(Ca_{1-a}, Li_a)CoO_3$, $Na_a)MnO_3$, $(Ca_{1-a}, Li_a)MnO_3$, $(Ca_{1-a}, Na_a)MgO_3$, $(Ca_{1-a}, Li_a)MgO_3$, $(Ca_{1-a}, Na_a)FeO_3$, and $(Ca_{1-a}, Li_a)FeO_3$, and a in the metal oxides may be $0<a\leq0.3$. For example, a range of a may be $0<a\leq0.12$.

In the composite cathode active material, the first metal oxide may include a plurality of crystalline phases having different compositions from one another. The first metal oxide may comprise crystalline phases having at least two different compositions instead of a compound formed of a single phase. For example, the plurality of crystalline phases may form a composite phase. The composite phase may comprise the plurality of crystalline phases in a composite form through a chemical bond instead of a simple mixture of the plurality of crystalline phases. The crystalline phases having different compositions from one another in the composite phase may be homogeneously distributed.

For example, the first metal oxide may have a composition represented by Formula 2:

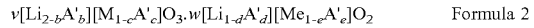  Formula 2

In Formula 2, A' is a metal selected from Li, Na, Ca, Ag, K, Mg, and Cu, M is at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and rare earth elements, Me is at least one metal selected from Mn, V, Cr, Fe, Co, Ni, Zr, Re, Al, B, Ge, Ru, Sn, Ti, Nb, Mo, and Pt, wherein $0<v<1$, $0<w<1$, and $v+w=1$; $0\leq b<1$, $0\leq c<1$, $0\leq d<1$, $0\leq e<1$, and $0\leq A'/Li\leq0.3$; and A'/Li is a mole ratio of A' to Li in the composite cathode active material. For example, in Formula 2, b, c, d, e, and A'/Li may satisfy $0\leq b<0.3$, $0\leq c<0.3$, $0\leq d<0.3$, $0\leq e<0.3$, and $0\leq A'/Li\leq0.2$, where $0\leq b+c+d+e<0.3$. For example, in Formula 2, b, c, d, e, and A'/Li may satisfy $0\leq b<0.3$, $0\leq c<0.3$, $0\leq d<0.3$, $0\leq e<0.3$, and $0\leq A'/Li\leq0.2$, where $0<b+c+d+e<0.3$.

For example, the first metal oxide may have a composition represented by Formula 2a:

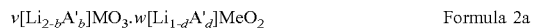  Formula 2a

In Formula 2a, A' is a metal selected from Li, Na, Ca, Ag, K, Mg, and Cu, M is at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and rare earth elements, Me is at least one metal selected from Mn, V, Cr, Fe, Co, Ni, Zr, Re, Al, B, Ge, Ru, Sn, Ti, Nb, Mo, and Pt, wherein $<v<1$, $0<w<1$, and $v+w=1$; $1\leq b<1$, $0\leq d<1$, and $0\leq A'/Li\leq0.3$ and A'/Li is a mole ratio of A' to Li in the composite cathode active material. For example, in Formula 2a, b, d, and A'/Li may satisfy $0\leq b<0.3$, $0\leq A'/Li\leq0.2$, and $0\leq b+d<0.3$.

In the composite cathode active material, the first metal oxide and the second metal oxide may form a composite. The first metal oxide having a layered crystal structure and the second metal oxide having a perovskite crystal structure may form a composite. The composite is different from a mere physical mixture, and a crystalline phase having a layered crystal structure and a crystalline phase having a perovskite structure are chemically bound in the composite.

Also, the composite cathode active material may have a configuration including the second metal oxide that is intermixed within the layered crystal structure of the first metal oxide. That is, a crystalline phase including the perovskite crystal structure of the second metal oxide may be intermixed in the crystalline phase including the layered crystal structure of the first metal oxide. Thus, the crystalline phase having the layered crystal structure and the crystalline phase having the perovskite structure may be homogenously distributed in the composite. Accordingly, the configuration of the composite is different from a configuration including the first metal oxide coated with the second metal oxide or a configuration including the second metal oxide coated with the first metal oxide.

The composite cathode active material may have a composition represented by Formula 3:

$$x[Li_{2-b}A'_b][M_{1-c}A'_c]O_3 \cdot y[Li_{1-d}A'_d][Me_{1-e}A'_e]O_2 \cdot z[A_{1-a}A'_a]M^1O_3 \quad \text{Formula 3}$$

In Formula 3, A' is a metal selected from Li, Na, Ca, Ag, K, Mg, and Cu, A is a metal selected from La, Sr, Ba, Ce, Y, and Sc, $M^1$ is at least one metal selected from Mn, V, Cr, Fe, Co, Ni, Zr, Ti, Mg, Cu, Nb, Ta, Ru, W, and Sn, M is at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and rare earth elements, and Me is at least one metal selected from Mn, V, Cr, Fe, Co, Ni, Zr, Re, Al, B, Ge, Ru, Sn, Ti, Nb, Mo, and Pt, where $0<x<1$, $0<y<1$, $0<z<0.1$, and $x+y+z=1$; $0<a\leq0.3$, $0\leq b<1$, $0\leq c<1$, $0\leq d<1$, $0\leq e<1$, $0<a+b+c+d+e<0.3$, and $0\leq A'/Li<0.3$; and A'/Li is a mole ratio of A' to Li in the composite cathode active material.

For example, in Formula 3, a, b, c, d, e, and A'/Li may satisfy $0<a\leq0.3$, $0\leq b<0.3$, $0\leq c<0.3$, $0\leq d<0.3$, $0\leq e<0.3$, $0<a+b+c+d+e<0.3$, and $0\leq A'/Li<0.3$. For example, in Formula 3, a, b, c, d, e, and A'/Li may satisfy $0<a\leq0.2$, $0\leq b<0.2$, $0\leq c<0.2$, $0\leq d<0.2$, $0\leq e<0.2$, $0<a+b+c+d+e<0.2$, and $0\leq A'/Li<0.2$. For example, in Formula 3, a, b, c, d, e, and A'/Li may satisfy $0<a\leq0.12$, $0\leq b<0.12$, $0\leq c<0.12$, $0\leq d<0.12$, $0\leq e<0.12$, $0<a+b+c+d+e<0.12$, and $0\leq A'/Li<0.12$. For example, in Formula 3, a, b, c, d, e, and A'/Li may satisfy $0<a\leq0.10$, $0\leq b<0.10$, $0\leq c<0.10$, $0\leq d<0.10$, $0\leq e<0.10$, $0<a+b+c+d+e<0.10$, and $0\leq A'/Li<0.10$.

For example, the composite cathode active material may have a composition represented by Formula 3a:

$$x[Li_{2-b}A'_b]MO_3 \cdot y[Li_{1-d}A'_d]MeO_2 \cdot z[A_{1-a}A'_a]M^1O_3 \quad \text{Formula 3a}$$

In Formula 3a, A' is a metal selected from Li, Na, Ca, Ag, K, Mg, and Cu, A is a metal selected from La, Sr, Ba, Ce, Y, and Sc, $M^1$ is at least one metal selected from Mn, V, Cr, Fe, Co, Ni, Zr, Ti, Mg, Cu, Nb, Ta, Ru, W, and Sn, M is at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and rare earth elements, Me is at least one metal selected from Mn, V, Cr, Fe, Co, Ni, Zr, Re, Al, B, Ge, Ru, Sn, Ti, Nb, Mo, and Pt, where $0<x<1$, $0<y<1$, $0<z<0.1$, and $x+y+z=1$; $0<a\leq0.3$, $0\leq b<1$, $0\leq d<1$, $0<a+b+d<0.3$, and $0\leq A'/Li<0.3$; and A'/Li is a mole ratio of A' to Li in the composite cathode active material.

For example, the composite cathode active material may have a composition represented by Formula 4:

$$x[Li_{2-b}A'_b][Mn_{1-c}A'_c]O_3 \cdot y[Li_{1-d}A'_d][(Ni_pCo_qMn_r)_{1-e}A'_e]O_2 \cdot z[La_{1-a}A'_a]MnO_3 \quad \text{Formula 4}$$

In Formula 4, A' is a metal selected from Li, Na, Ca, Ag, K, Mg, and Cu, where $0<x<1$, $0<y<1$, $0<z<0.1$, and $x+y+z=1$; $0<p<1$, $0<q<1$, $0<r<1$, and $p+q+r=1$; $0<a\leq0.3$, $0\leq b<1$, $0\leq c<1$, $0\leq d<1$, $0\leq e<1$, $0<a+b+c+d+e<0.3$, and $0\leq A'/Li<0.3$; and A'/Li is a mole ratio of A' to Li in the composite cathode active material.

For example, the composite cathode active material may have a composition represented by Formula 4a:

$$x[Li_{2-b}A'_b]MnO_3 \cdot y[Li_{1-d}A'_d](Ni_pCo_qMn_r)O_2 \cdot z[La_{1-a}A'_a]MnO_3 \quad \text{Formula 4a}$$

In Formula 4a, A' is a metal selected from Li, Na, Ca, Ag, K, Mg, and Cu, where $0<x<1$, $0<y<1$, $0<z<0.1$, and $x+y+z=1$; $0<p<1$, $0<q<1$, $0<r<1$, and $p+q+r=1$; $0<a\leq0.3$, $0\leq b<1$, $0\leq d<1$, $0<a+b+d<0.3$, and $0\leq A'/Li<0.3$; and A'/Li is a mole ratio of A' to Li in the composite cathode active material.

For example, the composite cathode active material may have a composition represented by Formula 5:

$$x[Li_{2-b}Na_b][Mn_{1-c}Na_c]O_3 \cdot y[Li_{1-d}Na_d][(Ni_pCo_qMn_r)_{1-e}Na_e]O_2 \cdot z[La_{1-a}Na_a]MnO_3 \quad \text{Formula 5}$$

In Formula 5, $0<x<1$, $0<y<1$, $0<z<0.1$, and $x+y+z=1$; $0<p<1$, $0<q<1$, $0<r<1$, and $p+q+r=1$; and $0<a\leq0.3$, $0\leq b<1$, $0\leq c<1$, $0\leq d1$, $0\leq e<1$, $0<a+b+c+d+e<0.3$, and $0\leq Na/Li<0.3$.

For example, the composite cathode active material may have a composition represented by Formula 5a:

$$x[Li_{2-b}Na_b]MnO_3 \cdot y[Li_{1-d}Na_d](Ni_pCo_qMn_r)O_2 \cdot z[La_{1-a}Na_a]MnO_3 \quad \text{Formula 5a}$$

In Formula 5a, $0<x<1$, $0<y<1$, $0<z<0.1$, and $x+y+z=1$; $0<p<1$, $0<q<1$, $0<r<1$, and $p+q+r=1$; and $0<a\leq0.3$, $0\leq b<1$, $0\leq d<1$, $0<a+b+d<0.3$, and $0\leq Na/Li<0.3$.

According to another embodiment, a cathode includes the composite cathode active material. The cathode may be prepared by molding a composite cathode active material composition including the composite cathode active material and a binder into a predetermined shape or by coating a current collector such as an aluminum thin film with the composite cathode active material composition.

In particular, a cathode active material composition is prepared by mixing the composite cathode active material, a conducting agent, a binder, and a solvent. A cathode plate is prepared by directly coating and drying a metal current collector with the cathode active material composition. Alternatively, the cathode active material composition may be cast on a separate support, and then a metal current collector is laminated with a film detached from the support to prepare a cathode plate. The cathode is not limited to the configurations described above and may have other configurations.

In some embodiments, the cathode may further include a typical cathode active material known in the art that has at least one different technical feature, such as a composition or a physical property, from that of the composite cathode active material, in addition to the composite cathode active material.

The typical cathode active material is a lithium-containing metal oxide which may be any cathode active material available in the art. For example, at least one type of a composite oxide of lithium and a metal selected from cobalt, manganese, nickel, and a combination thereof, and examples of the composite oxide may include a compound represented by one of the following chemical formulae: $Li_aA_{1-b}B'_bD'_2$ (where, $0.90\leq a\leq1.1$ and $0\leq b\leq0.5$); $Li_aE_{1-b}B'_bO_{2-c}D'_c$ (where, $0.90\leq a\leq1.1$, $0\leq b\leq0.5$, and $0\leq c\leq0.05$); $LiE_{2-b}B'_bO_{4-c}D'_c$ (where, $0\leq b\leq0.5$ and $0\leq c\leq0.05$); $Li_aNi_{1-b-c}Co_bB'_cD'_\alpha$ (where, $0.90\leq a\leq1.1$, $0\leq b\leq0.5$, $0\leq c\leq0.05$, and $0<\alpha\leq2$); $Li_aNi_{1-b-c}Co_bB'_cO_{2-\alpha}F'_\alpha$ (where, $0.90\leq a\leq1.1$, $0 \leq b \leq 0.5$, $0 \leq c \leq 0.05$, and $0<\alpha<2$); $Li_aNi_{1-b-c}Co_bB'_cO_{2-\alpha}F''_2$ (where, $0.90 \leq a \leq 1.1$, $0 \leq b \leq 0.5$, $0 \leq c \leq 0.05$, and $0<\alpha<2$); $Li_aNi_{1-b-c}Mn_bB'_cD'_\alpha$ (where, $0.90 \leq a \leq 1.1$, $0 \leq b \leq 0.5$, $0 \leq c \leq 0.05$, and $0<\alpha 2$); $Li_aNi_{1-b-c}Mn_bB'_cO_{2-\alpha}F'_\alpha$ (where, $0.90 \leq a \leq 1.1$, $0 \leq b \leq 0.5$, $0 \leq c \leq 0.05$, and $0<\alpha<2$); $Li_aNi_{1-b-c}Mn_bB'_cO_{2-\alpha}F''_2$ (where, $0.90 \leq a \leq 1.1$, $0 \leq b \leq 0.5$, $0 \leq c \leq 0.05$, and $0<\alpha<2$); $Li_aNi_bE_cG_dO_2$ (where, $0.90 \leq a \leq 1.1$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.1$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.1$ and $0.001 \leq b \leq 0.1$); $Li_aCoG_bO_2$ (where, $0.90 \leq a \leq 1.1$ and $0.001 \leq b \leq 0.1$); $Li_aMnG_bO_2$ (where, $0.90 \leq a \leq 1.1$ and $0.001 \leq b \leq 0.1$); $Li_aMn_2G_bO_4$ (where, $0.90 \leq a \leq 1.1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and a compound represented by one of formulae of $LiFePO_4$.

In the formulae, A is at least one selected from Ni, Co, and Mn; B' is at least one selected from Al, Ni, Co, Mn, Cr, Fe, Mg, Sr, V, and a rare earth element; D' is at least one selected from O, F', S, and P; E is at least one selected from Co, and Mn; F' is at least one selected from F, S, and P; G is at least one selected from Al, Cr, Mn, Fe, Mg, La, Ce, Sr, and V; Q is at least one selected from Ti, Mo, and Mn; I' is at least one selected from Cr, V, Fe, Sc, and Y; and J is at least one selected from V, Cr, Mn, Co, Ni, and Cu.

Examples of the cathode active material may include $LiCoO_2$, $LiMn_xO_{2x}$ (wherein x is 1 or 2), $LiNi_{1-x}Mn_xO_{2x}$ (wherein $0<x<1$), $LiNi_{1-x-y}Co_xMn_yO_2$ (wherein $0 \leq x \leq 0.5$ and $0 \leq y \leq 0.5$), and $LiFePO_4$.

A surface of the compound may have a coating layer or the compound and a compound having a coating layer may be used as a mixture. The coating layer may include a compound of a coating element such as an oxide of a coating element, a hydroxide of a coating element, an oxyhydroxide of a coating element, an oxycarbonate of a coating element, or a hydroxyl carbonate of a coating element. The compound forming the coating layer may be amorphous or crystalline. The coating element included in the coating layer may comprise at least one selected from Mg, Al, Co, K, Na, Ca, Si, Ti, V, Sn, Ge, Ga, B, As, and Zr. A formation process (e.g., spray coating or dip-coating) of the coating layer may be any coating method that does not negatively affect physical properties of the cathode active material by using the elements above, and the coating method may be well understood by those of ordinary skill in the art, so the description of the coating method is omitted in the present specification.

Examples of the conducting agent may include carbon black or graphite particulates, but they are not limited thereto, and any suitable conducting agent available in the art may be used.

Examples of the binder may include a vinylidene fluoride/hexafluoropropylene copolymer, polyvinylidene fluoride (PVDF), polyacrylonitrile, polymethylmethacrylate, polytetrafluoroethylene, mixtures thereof, or a styrene butadiene rubber polymer, but they are not limited thereto, and any suitable binder available in the art may be used.

Examples of the solvent may include N-methyl-pyrrolidone (NMP), acetone, and water, but they are not limited thereto, and any suitable solvent available in the art may be used.

The amounts of the cathode active material, the conducting agent, the binder, and the solvent are those levels that are used in the manufacture of a lithium battery and can be determined by one of skill in the art without undue experimentation. Depending on the use or structure of the lithium battery, one or more of the conducting agent, the binder, and the solvent may be omitted.

According to another embodiment, a lithium battery includes a cathode including the composite cathode active material. The lithium battery may be prepared as follows.

First, a cathode is prepared according to the cathode preparation method.

Next, an anode may be prepared as follows. The anode may be prepared in the same manner as in the preparation of the cathode, except that an anode active material is used instead of the composite cathode active material. Also, in the anode active material composition, a conducting agent, a binder, and a solvent may be the same as those defined in connection with the preparation of the cathode.

For example, the anode active material composition is prepared by mixing an anode active material, a conducting agent, a binder, and a solvent, and then the anode active material composition is directly coated on a copper current collector to prepare an anode plate. Alternatively, the anode active material composition may be cast on a separate support to form an anode active material film, which is then separated from the support and laminated on a copper current collector to prepare an anode plate.

Also, the anode active material may be any material available in the art as an anode active material. For example, at least one selected from the group consisting of a lithium metal, a metal alloyable with lithium, a transition metal oxide, a non-transition metal oxide, and a carbonaceous material.

Examples of the metal alloyable with lithium may include Si, Sn, Al, Ge, Pb, Bi, Sb, a Si—Y' alloy (wherein Y' is an alkaline metal, an alkaline earth metal, Group 13 element, Group 14 element, a transition metal, a rare earth element, or a combined element thereof, and is not Si), or a Sn—Y" alloy (wherein Y" is an alkaline metal, an alkaline earth metal, Group 13 element, Group 14 element, a transition metal, a rare earth element, or a combined element thereof, and is not Sn). Examples of the element Y may include at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

Examples of the transition metal oxide may include a lithium titanium oxide, a vanadium oxide, or a lithium vanadium oxide.

Examples of the non-transition metal oxide may include $SnO_2$ or $SiO_x$ (wherein $0<x<2$).

The carbonaceous material may be crystalline carbon, amorphous carbon, or a mixture thereof. The crystalline carbon may be graphite such as shapeless, plate, flake, spherical, or fibrous natural graphite or artificial graphite, and the amorphous carbon may be soft carbon (low-temperature fired carbon) or hard carbon, mesophase pitch carbide, or fired coke.

The amounts of the anode active material, the conducting agent, the binder, and the solvent are those levels that are generally used in the manufacture of a lithium battery.

Next, a separator to be disposed between the cathode and the anode is prepared. The separator for the lithium battery may be any separator that is commonly used in lithium batteries. The separator may have low resistance to migration of ions in an electrolyte and have an excellent electrolyte-retaining ability. For example, the separator may be selected from glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition is directed coated and dried on an electrode to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. For example, the polymer resin may comprise at least one selected from a vinylidenefluoride/hexafluoropropylene copolymer, polyvinylidene fluoride (PVDF), polyacrylonitrile, and polymethylmethacrylate.

Next, an electrolyte is prepared.

For example, the electrolyte may be an organic electrolyte. Also, the electrolyte may be solid. Examples of the electrolyte may include a boron oxide and a lithium oxynitride, but they are not limited thereto, and any solid electrolyte available in the art may be used. The solid electrolyte may be formed on the anode by using a sputtering method.

For example, an organic electrolyte solution may be prepared. The organic electrolyte solution may be prepared by dissolving a lithium salt in an organic solvent.

The organic solvent may comprise any suitable organic solvent available in the art. Examples of the organic solvent may include at least one selected from propylene carbonate, ethylene carbonate, fluoroethylene carbonate, diethyl carbonate, methylethyl carbonate, methylpropyl carbonate, butylenes carbonate, bezonitrile, acetonitrile, tetrahydrofuran, 2-methyltetrahydrofuran, y-butyrolactone, dioxolane, 4-methyldioxolane, N,N-dimethyl formamide, dimethylacetamide, dimethylsulfoxide, dioxane, 1,2-dimethoxyethane, sulforane, dichloroethane, chlorobenzene, nitrobenzene, diethyleneglycol, and dimethylether.

The lithium salt may comprise any suitable material available as a lithium salt in the art. For example, the lithium salt may comprise at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO2)(C_yF_{2y+1}SO_2)$ (where, x and y are natural numbers), LiCl, and LiI.

Figure 5:
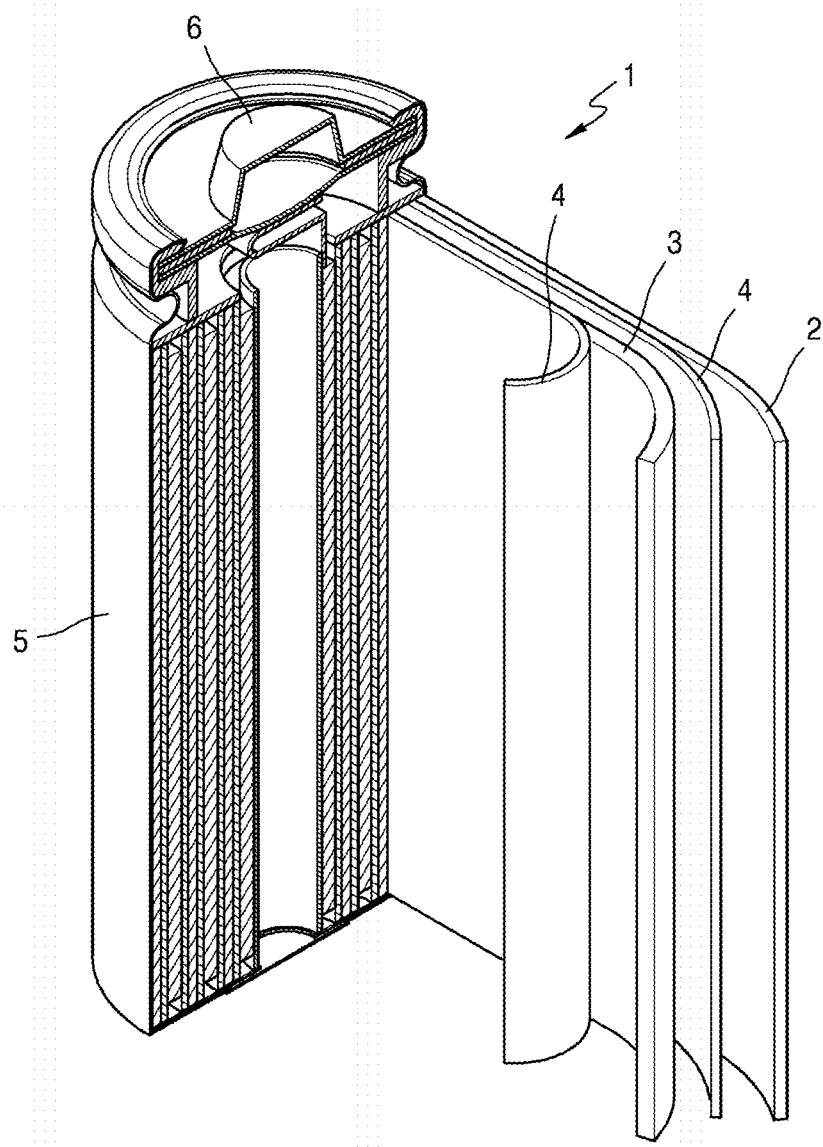
FIG. 5 shows a schematic view of an embodiment of a lithium battery.

As shown in FIG. 5, a lithium battery 1 includes a cathode 3, an anode 2, and a separator 4. The cathode 3, the anode 2, and the separator 4 are wound or folded, and then accommodated in a battery case 5. Then, the battery case 5 is filled with an organic electrolyte solution and sealed with a cap assembly 6, thereby completing manufacture of the lithium battery 1. The battery case 5 may be a cylindrical type, a rectangular type, or a thin-film type. For example, the lithium battery 1 may be a large-sized thin-film type battery. The lithium battery 1 may be a lithium ion battery.

The separator may be interposed between the cathode and the anode to form a battery assembly. The battery assembly may be stacked in a bi-cell structure and impregnated with the electrolyte solution. The resultant is put into a pouch and hermetically sealed, thereby completing manufacture of a lithium ion polymer battery.

Alternatively, a plurality of battery assemblies may be stacked to form a battery pack, which may be used in any device that requires high capacity and high output, for example, in a laptop computer, a smart phone, or an electric vehicle (EV). For example, the lithium battery may be used in a hybrid vehicle such as a plug-in hybrid electric vehicle (PHEV). Also, the lithium battery may be used in a device that requires a high electric power storage. Examples of the device that requires a high electric power storage may include electric bicycles or electrical tools.

According to another embodiment, a method of preparing the composite cathode active material may include preparing a solution including at least one transition metal precursor; obtaining a transition metal hydroxide by precipitating the transition metal precursor; and mixing and heat-treating the transition metal hydroxide, a lithium precursor, a first metal precursor, a second metal precursor, and a third metal precursor.

In the preparing of the solution including at least one transition metal precursor, at least two transition metal precursors may include a manganese precursor and a precursor of another metal. For example, the manganese precursor may be manganese sulfate or manganese acetate. For example, the precursor of another metal may be nickel sulfate, nickel acetate, copper sulfate, tin chloride, titanium isopropoxide, cobalt acetate, or ruthenium acetylacetonate. A molar ratio of the manganese and another metal may be selected according to a composition of the desired product.

In the precipitating of the transition metal precursor to prepare a transition metal hydroxide, the precipitating process may be performed by using a chelating agent and a precipitating agent. The chelating agent may be an ammonium hydroxide. The precipitating agent may be a sodium hydroxide. The precipitated transition metal hydroxide may be prepared in the form of a dried product through filtration and washing process.

In the mixing and heat-treating the transition metal hydroxide and the lithium precursor, the first metal precursor, the second metal precursor, and the third metal precursor, the lithium precursor may be a lithium carbonate; the first metal precursor may be a lanthanum hydroxide; the second metal precursor may be a sodium carbonate; and the third metal precursor may be a manganese carbonate.

The heat-treating of the precipitate may be performed at a temperature in a range of about 500° C. to about 950° C. for about 5 hours to about 20 hours, but embodiments are not limited thereto, and the temperature and time for the heat-treating may be appropriately selected according to a composition and a physical property of the desired product. The heat-treated lithium metal oxide may be dry-cooled in a furnace. The heat-treatment may be performed in the air, but embodiments are not limited thereto, and the heat-treatment may be performed in an oxidizing atmosphere.

The present invention will be described in further detail with reference to the following examples. These examples are for illustrative purposes only and shall not limit the scope of the present disclosure.

EXAMPLES

Preparation of Perovskite Metal Oxide

Reference Example 1

A lanthanum hydroxide ($La(OH)_3$) and a manganese carbonate ($MnCO_3$) were stoichiometrically mixed to prepare $LaMnO_3$. The mixture was heat-treated at a temperature of 900° C. for 10 hours in the air, and thus $LaMnO_3$ was prepared.

Reference Example 2

A lanthanum hydroxide ($La(OH)_3$) and a sodium carbonate ($Na_2CO_3$) were stoichiometrically mixed to prepare $La_{0.9}Na_{0.1}MnO_3$. The mixture was heat-treated at a temperature of 900° C. for 10 hours in the air, and thus $La_{0.9}Na_{0.1}MnO_3$ was prepared.

Reference Example 3

A lanthanum hydroxide $(La(OH)_3)$, a sodium carbonate $(Na_2CO_3)$, and a manganese carbonate $(MnCO_3)$ were stoichiometrically mixed to prepare $La_{0.8}Na_{0.2}MnO_3$. The mixture was heat-treated at a temperature of 900° C. for 10 hours in the air, and thus $La_{0.8}Na_{0.2}MnO_3$ was prepared.

Reference Example 4

A lanthanum hydroxide $(La(OH)_3)$, a sodium carbonate $(Na_2CO_3)$, and a manganese carbonate $(MnCO_3)$ were stoichiometrically mixed to prepare $La_{0.7}Na_{0.3}MnO_3$. The mixture was heat-treated at a temperature of 900° C. for 10 hours in the air, and thus $La_{0.7}Na_{0.3}MnO_3$ was prepared.

Reference Example 5

A lanthanum hydroxide $(La(OH)_3)$, a sodium carbonate $(Na_2CO_3)$, and a manganese carbonate $(MnCO_3)$ were stoichiometrically mixed to prepare $La_{0.5}Na_{0.5}MnO_3$. The mixture was heat-treated at a temperature of 900° C. for 10 hours in the air, and thus $La_{0.5}Na_{0.5}MnO_3$ was prepared.

Reference Example 6

A sodium carbonate $(Na_2CO_3)$ and a manganese carbonate $(MnCO_3)$ were stoichiometrically mixed to prepare $NaMnO_3$. The mixture was heat-treated at a temperature of 900° C. for 10 hours in the air, and thus $NaMnO_3$ was prepared.
(Preparation of Composite Cathode Active Material)

Comparative Example 1

Layer-Layered Composite

Nickel sulfate, cobalt sulfate, and manganese sulfate, as starting materials, were stoichiometrically mixed to prepare a composite cathode active material $(0.4Li_2MnO_3 \cdot 0.6LiNi_{0.417}Co_{0.167}Mn_{0.417}O_2)$ Nickel sulfate, cobalt sulfate, and manganese sulfate were dissolved in distilled water so that the solution has a concentration of 2 M to prepare a precursor mixture. $NH_4OH$, as a chelating agent, and NaOH, as a precipitating agent, were added to the precursor mixture to perform co-precipitation, and thus a precipitate $(Ni,Co,Mn)(OH)_2$ was obtained.

The precipitate $((Ni,Co,Mn)(OH)_2)$ thus obtained was washed with distilled water and dried at a temperature of 80° C. for 12 hours to prepare a $(Ni,Co,Mn)(OH)_2$ powder having an average particle diameter of 5 μm. The (Ni,Co,Mn)(OH)$_2$ powder was mixed with lithium carbonate $(Li_2CO_3)$. Here, the lithium carbonate was stoichiometrically mixed to prepare composite cathode active material $(0.4Li_2MnO_3 \cdot 0.6LiNi_{0.417}Co_{0.167}Mn_{0.417}O_2)$ The mixture was heat-treated at a temperature of 900° C. for 10 hours in the air, and thus a composite cathode active material $(0.4Li_2MnO_3 \cdot 0.6LiNi_{0.417}Co_{0.167}Mn_{0.417}O_2)$ was prepared.

Comparative Example 2

Layer-Layer-perovskite Composite

A $(Ni,Co,Mn)(OH)_2$ powder was obtained in the same manner as in Comparative Example 1.

The $(Ni,Co,Mn)(OH)_2$ powder was mixed with lithium carbonate $(Li_2CO_3)$, lanthanum hydroxide $(La(OH)_3)$, and manganese carbonate $(MnCO_3)$. Here, lithium carbonate, lanthanum hydroxide, and manganese carbonate were stoichiometrically mixed to prepare a composite cathode active material $(0.975[0.4Li_2MnO_3 \cdot 0.6LiNi_{0.417}Co_{0.167}Mn_{0.417}O_2] \cdot 0.025LaMnO_3)$.

The mixture was heat-treated at a temperature of 900° C. for 10 hours in the air, and thus a composite cathode active material $(0.975[0.4Li_2MnO_3 \cdot 0.6LiNi_{0.417}Co_{0.167}Mn_{0.417}O_2] \cdot 0.025LaMnO_3)$.

Example 1

Layer-Layer-perovskite Composite Doped with 4 mol % of Na

A $(Ni,Co,Mn)(OH)_2$ powder was obtained in the same manner as in Comparative Example 1.

The $(Ni,Co,Mn)(OH)_2$ powder was mixed with a lithium carbonate $(Li_2CO_3)$, a lanthanum hydroxide $(La(OH)_3)$, a sodium carbonate $(Na_2CO_3)$, and a manganese carbonate $(MnCO_3)$. Here, the lithium carbonate, lanthanum hydroxide, sodium carbonate, and manganese carbonate were stoichiometrically mixed to prepare a composite cathode active material $(0.975[0.4(Li_{2-b}Na_b)MnO_3 \cdot 0.6(Li_{1-d}Na_d)(Ni_{0.417}Co_{0.167}Mn_{0.417})O_2] \cdot 0.025(La_{1-a}\ Na_a)MnO_3)$. The sodium carbonate and lithium carbonate were mixed so that an amount of sodium was 4 mol % with respect to the total mole number of lithium (Na/Li mole ratio=0.04).

The mixture was heat-treated at a temperature of 900° C. for 10 hours in the air, and thus a composite cathode active material $(0.975[0.4(Li_{2-b}Na_b)MnO_3 \cdot 0.6(Li_{1-d}Na_d)(Ni_{0.417}Co_{0.167}Mn_{0.417})O_2] \cdot 0.025(La_{1-a}\ Na_a)MnO_3)$, (a=b=d≠0, a+b+d=0.0442) was prepared.

Example 2

Layer-Layer-perovskite Composite Doped with 8 mol % of Na

A composite cathode active material was prepared in the same manner as in Example 1, except that a sodium carbonate and a lithium carbonate were mixed so that an amount of sodium was 8 mol % with respect to the total mole number of lithium (Na/Li mole ratio=0.08).

Thus, a composite cathode active material $(0.975[0.4(Li_{2-b}Na_b)MnO_3 \cdot 0.6(Li_{1-d}Na_d)(Ni_{0.417}Co_{0.167}Mn_{0.417})O_2] \cdot 0.025(La_{1-a}\ Na_a)MnO_3)$, (a=b=d≠0, a+b+d=0.0884) was obtained.

Example 3

Layer-Layer-perovskite Composite Doped with 16 mol % of Na

A composite cathode active material was prepared in the same manner as in Example 1, except that a sodium carbonate and a lithium carbonate were mixed so that an amount of sodium was 16 mol % with respect to the total mole number of lithium (Na/Li mole ratio=0.16).

Thus, a composite cathode active material $(0.975[0.4(Li_{2-b}Na_b)MnO_3 \cdot 0.6(Li_{1-d}Na_d)(Ni_{0.417}Co_{0.167}Mn_{0.417})O_2] \cdot 0.025(La_{1-a}Na_a)MnO_3)$, (a=b=d≠0, a+b+d=0.1768) was obtained.

Example 4

Layer-Layer-Perovskite Composite Doped with 4 mol % of Na, BaTiO₃ was Used Instead of LaMnO₃

A (Ni,Co,Mn)(OH)₂ powder was obtained in the same manner as in Comparative Example 1.

The (Ni,Co,Mn)(OH)₂ powder was mixed with a lithium carbonate (Li₂CO₃), a barium carbonate (BaCO₃), a sodium carbonate (Na₂CO₃), and a titanium oxide (TiO₂). Here, the lithium carbonate, barium carbonate, sodium carbonate, and titanium oxide were stoichiometrically mixed to prepare a composite cathode active material $(0.975[0.4(Li_{2-b}Na_b)MnO_3 \cdot 0.6(Li_{1-d}Na_d)(Ni_{0.417}Co_{0.167}Mn_{0.417})O_2] \cdot 0.025(Ba_{1-a}Na_a)TiO_3)$. A sodium carbonate and a lithium carbonate were mixed so that an amount of sodium was 4 mol % with respect to the total mole number of lithium (Na/Li mole ratio=0.04).

The mixture was heat-treated at a temperature of 900° C. for 10 hours in the air, and thus a composite cathode active material $(0.975[0.4(Li_{2-b}Na_b)MnO_3 \cdot 0.6(Li_{1-d}Na_d)(Ni_{0.417}Co_{0.167}Mn_{0.417})O_2] \cdot 0.025(Ba_{1-a}Na_a)TiO_3)$, (a=b=d≠0, a+b+d=0.0442) was prepared.

(Preparation of Cathode and Lithium Battery)

Comparative Example 3

The composite cathode active material powder synthesized in Comparative Example 1, a carbonaceous conducting agent (Denka Black), and polyvinylidene fluoride (PVDF), which is a binder, were homogenously mixed by using a solvent, N-methylpyrrolidone (NMP) at a weight ratio of 90:5:5 to prepare a slurry.

The slurry thus prepared was coated on an aluminum foil having a thickness of 15 μm at a loading amount of about 6 mg/cm² by using a doctor blade, vacuum-dried at a temperature of 120 for 2 hours, pressed by using a roll-press to prepare a cathode plate having a mixture density of about 2.4 g/cc, and thus a coin cell (CR2032 type) having a diameter of 12 mm was prepared.

In the preparation of the cell, metal lithium was used as a counter electrode, a ceramic-coated PE separator was used as a separator, and 1.3 M LiPF6 dissolved in a mixture solvent including ethylene carbonate (EC), ethylmethylcarbonate (EMC), and diethylcarbonate (DEC) at a volume ratio of 3:5:2 was used as an electrolyte.

Comparative Example 4

A lithium battery was prepared in the same manner as in Comparative Example 3, except that the composite cathode active material synthesized in Comparative Example 2 was used.

Examples 5 to 8

Lithium batteries were prepared in the same manner as in Comparative Example 3, except that the composite cathode active materials synthesized in Examples 1 to 4 were used, respectively.

Evaluation Example 1

XRD Test (1)

Figure 2C:
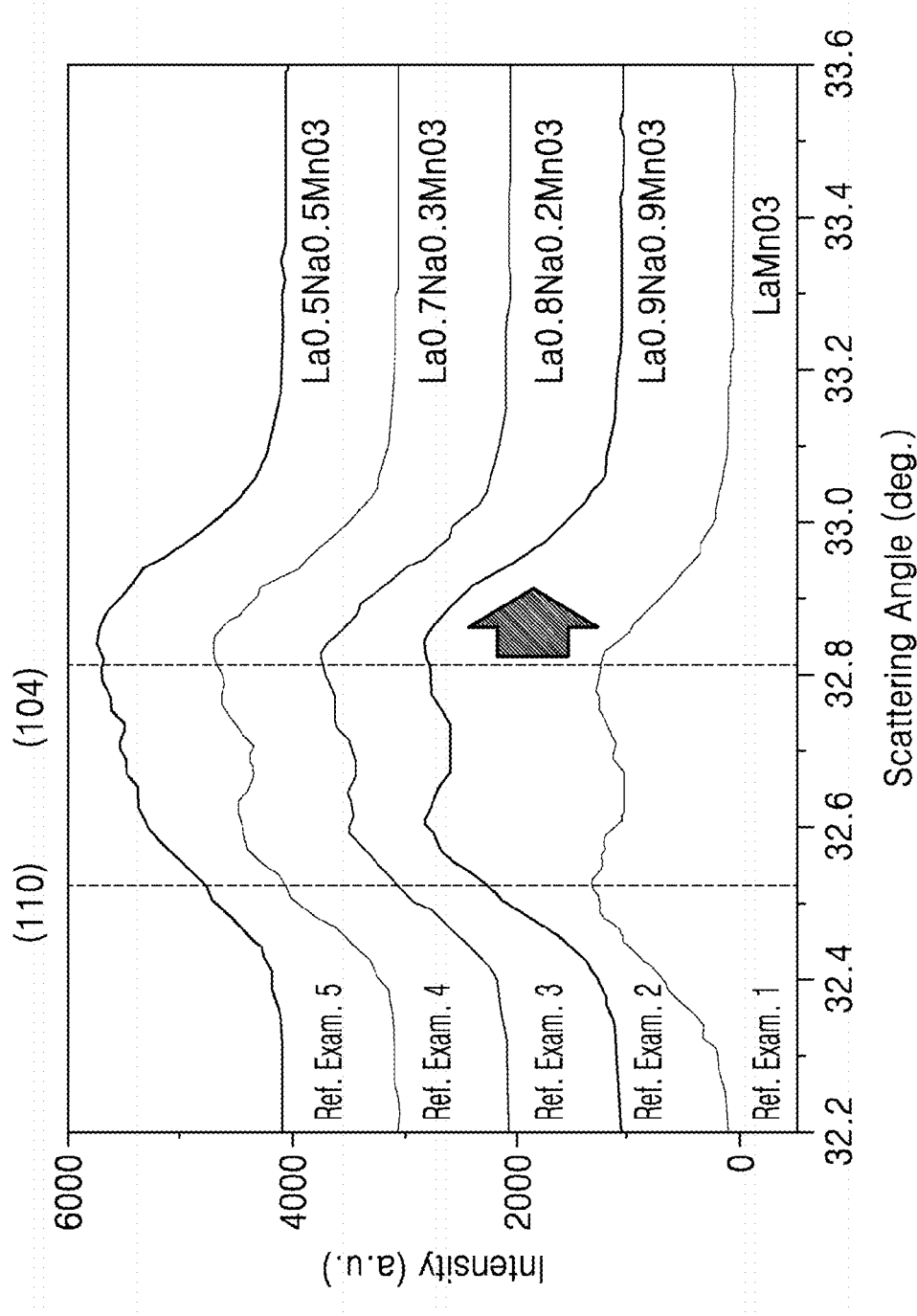

X-ray diffraction (XRD) test was performed on the metal oxides having a perovskite crystal structure prepared in Reference Examples 1 to 6, and the results are shown in FIGS. 2A to 2C. The XRD was measured by using a Cu-Kα ray.

In FIG. 2A, LaMnO3 had a feature peak corresponding to a perovskite crystal structure with respect to an amount of doped Na up to 30 mol %. Thus, presence of LaMnO₃ having a perovskite crystal structure was confirmed. Also, a peak corresponding to a new phase was not observed.

However, in FIG. 2A, when an amount of Na was 50 mol % or 100 mol %, it was confirmed that a new phase, such as Na₀.₇MnO₂ or NaMnO₂ was formed.

FIG. 2B is a magnified view of an area around 16 degree of a scattering angle in FIG. 2A. In FIG. 2B, it was clearly confirmed that a new phase was formed when an amount of Na was higher than 30 mol %.

FIG. 2C is a magnified view of an area around 33 degree of a scatter angle in FIG. 2A. In FIG. 2C, it was confirmed that a peak was shifted to the right as an amount of Na increased. The shift of the peak to the right is due to a reduction in a lattice size by replacing La with Na, which has a smaller ionic size compared to that of La.

Therefore, it was confirmed that Na replaced a site of La in the perovskite crystal structure, and the maximum amount of Na that may replace Na is 30 mol %.

As shown in FIG. 1, La is located at a site that is 12-fold cuboctahedrally coordinated with 12 oxygen atoms, each of which is placed in edges of a hexahedron, and Mn is located in 6-fold cubooctahedrally coordinated with 6 oxygen atoms, each of which is placed in a vertex of an octahedron, where an ion diameter of Mn is smaller than that of La. Also, Na may replace a site of La.

Evaluation Example 1

XRD Test (2)

Figure 3A:
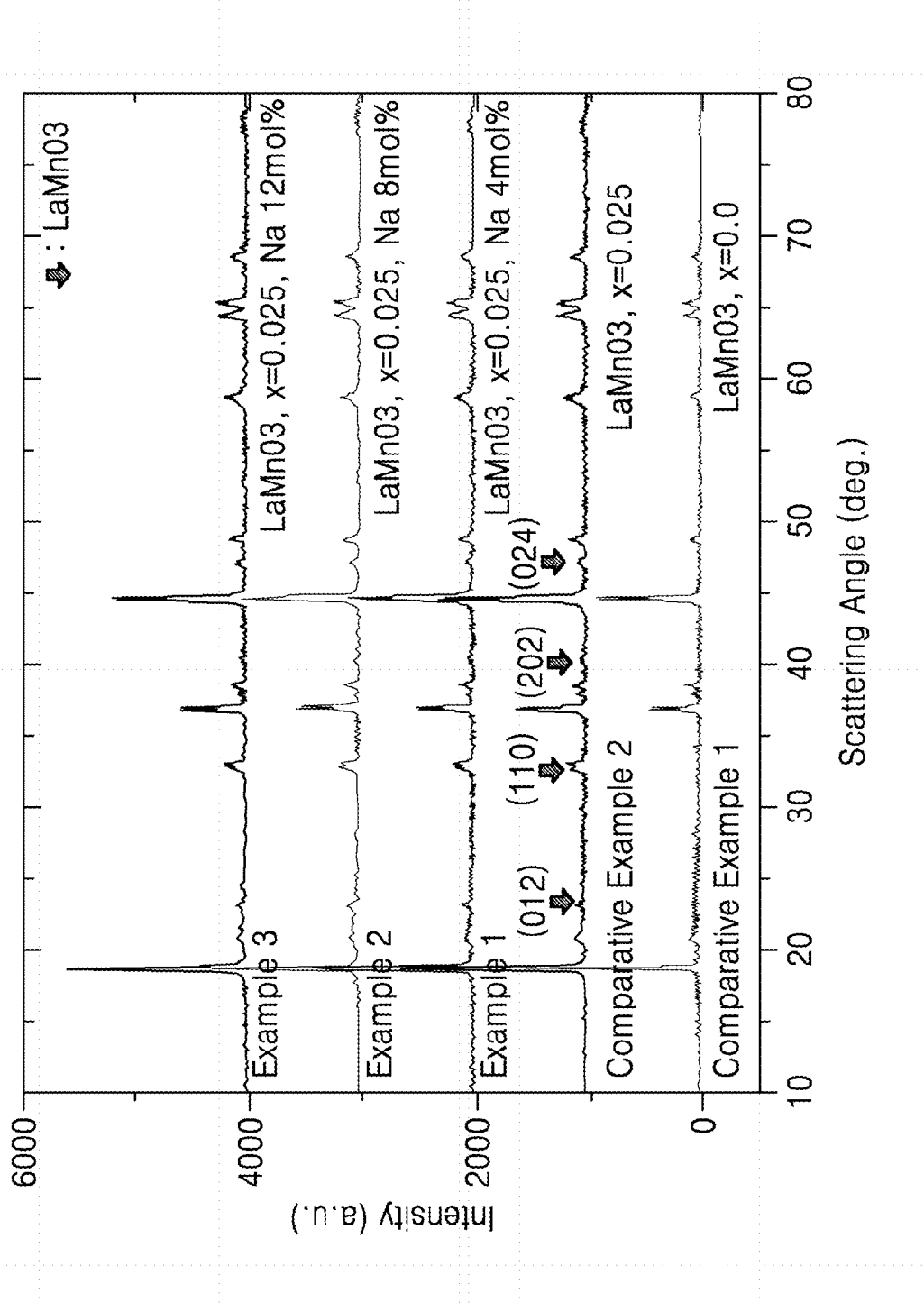
FIGS. 3A to 3C are each a graph of intensity (arbitrary units, a.u.) versus scattering angle (degrees two-theta, deg.) and are XRD spectra of composite cathode active materials prepared in Examples 1 to 3 and Comparative Examples 1 and 2.
Figure 3B:
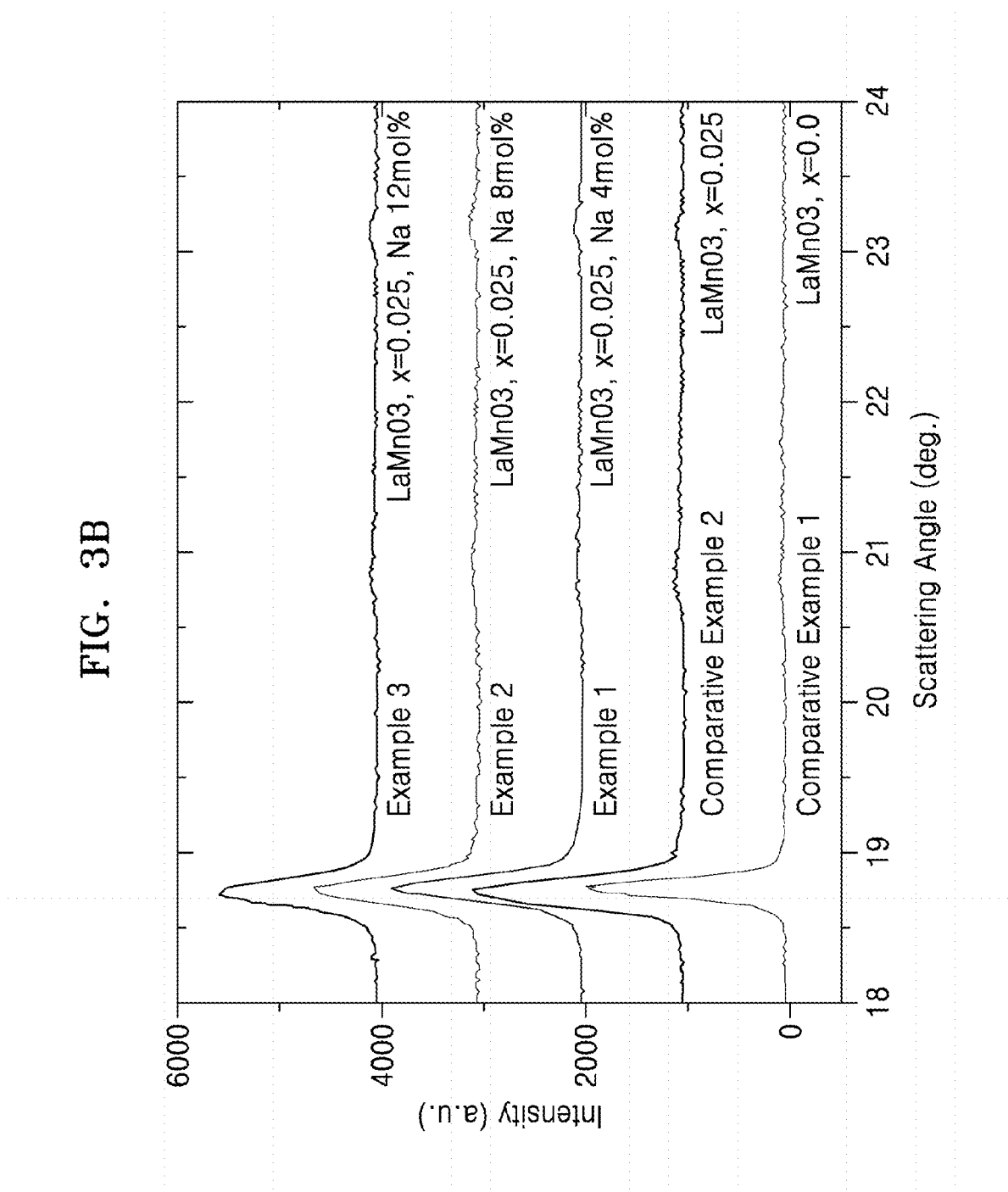
Figure 3C:
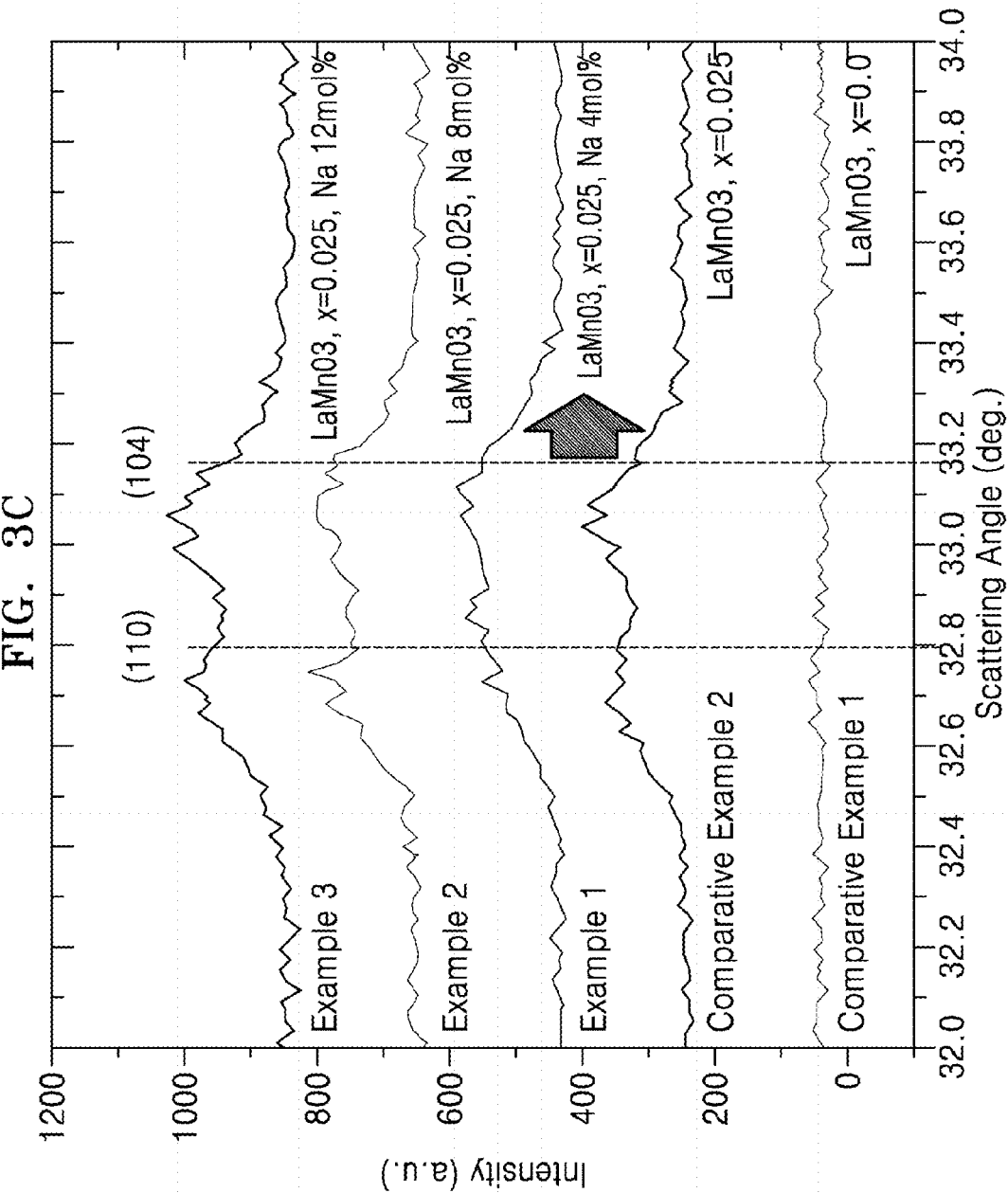

An X-ray diffraction (XRD) test was performed on the composite cathode active material powders prepared in Examples 1 to 3 and Comparative Examples 1 and 2, and the results are shown in FIGS. 3A to 3C. The XRD was measured by using a Cu-Kα ray.

In FIG. 3A, as LaMnO₃ is included in the lithium transition metal oxide having a layered crystal structure of Comparative Example 1, a feature peak corresponding to a perovskite crystal structure was additionally observed from the powder of Comparative Example 2. Thus, it was confirmed that a crystalline phase corresponding to a metal oxide having a layered crystal structure and a crystalline phase corresponding to LaMnO₃ having a perovskite crystal structure co-existed in the composite cathode active material. Thus, it may be confirmed that a lithium metal oxide having a layered crystal structure and a metal oxide having a perovskite crystal structure form a composite, and the metal oxide having a perovskite crystal structure is intermixed in the crystal structure of the lithium metal oxide having a layered crystal structure.

FIG. 3B is a magnified view of an area around 19 degree of a scatter angle in FIG. 3A. In FIG. 3B, it was confirmed that a new phase was not formed up to when an amount of Na was 12 mol % with respect to the total mole number of Li.

FIG. 3C is a magnified view of an area around 33 degree of a scatter angle in FIG. 3A. In FIG. 3C, it was confirmed that a peak was shifted to the right as an amount of Na increased. The shift of the peak to the right is due to a reduction in a lattice size by replacing La with Na, which has a smaller ionic size compared to that of La.

Therefore, it was confirmed that Na replaced a site of La in the perovskite crystal structure, and the replacement may take place without producing an impurity phase up to 12 mol % of an amount of Na.

Evaluation Example 2

EPMA Test

Electron probe micro analysis was performed on the composite cathode active materials prepared in Example 1 and Comparative Example 1, and distribution of metals in the composite cathode active material particle was confirmed.

As the result of the analysis, it was confirmed that Ni, Co, Mn, and Na were evenly distributed in the particle of the composite cathode active material prepared in Example 1. Thus, it was confirmed that Na was evenly replaced or doped throughout the whole composite cathode active material.

Evaluation Example 3

Charging/Discharging Test

The coin cells prepared in Examples 5 to 7 and Comparative Examples 3 and 4 were charged at a constant current of 0.1 C until a voltage was 4.7 V vs Li and discharged at a constant current of 0.1 C until a voltage was 2.5 V vs Li at a temperature of 25° C. to perform an activation cycle ($1^{st}$ cycle).

Then, the coin cells were charged at a constant current-constant voltage of 0.5 C until a voltage was 4.6 V vs Li and discharged at a constant current of 0.2 C until a voltage was 2.5 V ($2^{nd}$ cycle).

The coin cells were charged at a constant current-constant voltage of 0.5 C until a voltage was 4.6 V vs Li and discharged at a constant current of 0.5 C until a voltage was 2.5 V ($3^{rd}$ cycle).

The coin cells were charged at a constant current-constant voltage of 0.5 C until a voltage was 4.6 V vs Li and discharged at a constant current of 1.0 C until a voltage was 2.5 V ($4^{th}$ cycle).

The coin cells were charged at a constant current-constant voltage of 0.5 C until a voltage was 4.6 V vs Li and discharged at a constant current of 2.0 C until a voltage was 2.5 V ($5^{th}$ cycle).

The coin cells were charged at a constant current-constant voltage of 1.0 C until a voltage was 4.6 V vs Li and discharged at a constant current of 1.0 C until a voltage was 2.5 V, and this charging/discharging process was performed until $50^{th}$ cycle.

The results of charging/discharging of the coin cells are shown in Table 1. An initial discharge capacity, a capacity retention rate, and a voltage drop are calculated by following Equations 1 to 3.

Initial discharge capacity [mAh/g]=Discharge capacity at $2^{nd}$ cycle  Equation 1

Capacity retention rate [%]=[Discharge capacity at $50^{th}$ cycle/discharge capacity at $1^{st}$]×100  Equation 2

Voltage drop [mV]=[Average driving voltage at $1^{st}$ cycle during discharging process−Average driving voltage at $50^{th}$ cycle during discharging process]  Equation 3

The average driving voltage is a discharge voltage that corresponds to 50% of the total output during discharging process.

Figure 4A:
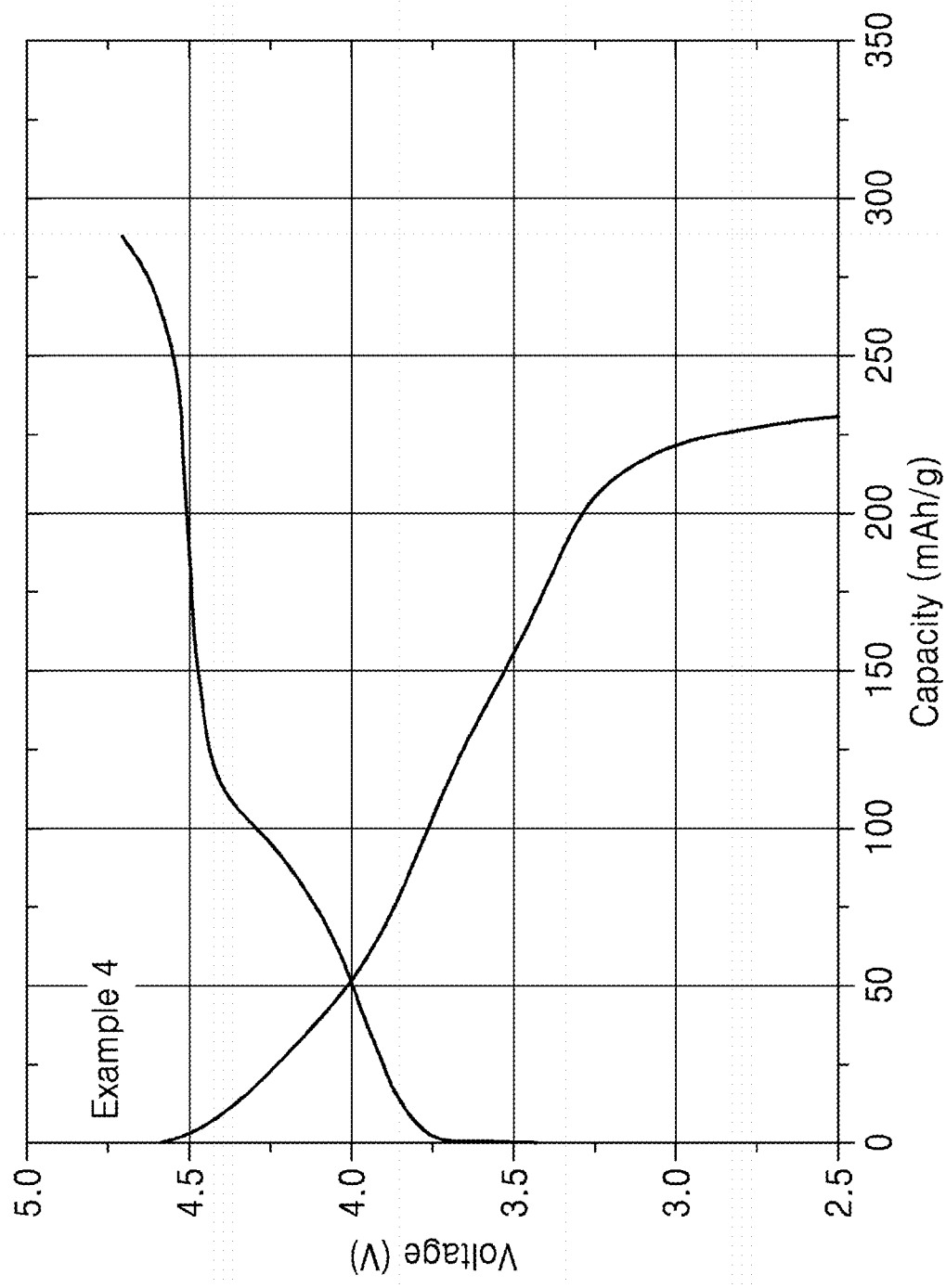
FIGS. 4A to 4C are each a graph of voltage (volts, V) versus capacity (milliampere hours per gram, mAh/g) and R voltage profiles during a $1^{st}$ cycle of charging/discharging of lithium batteries prepared in Examples 5 to 7.
Figure 4B:
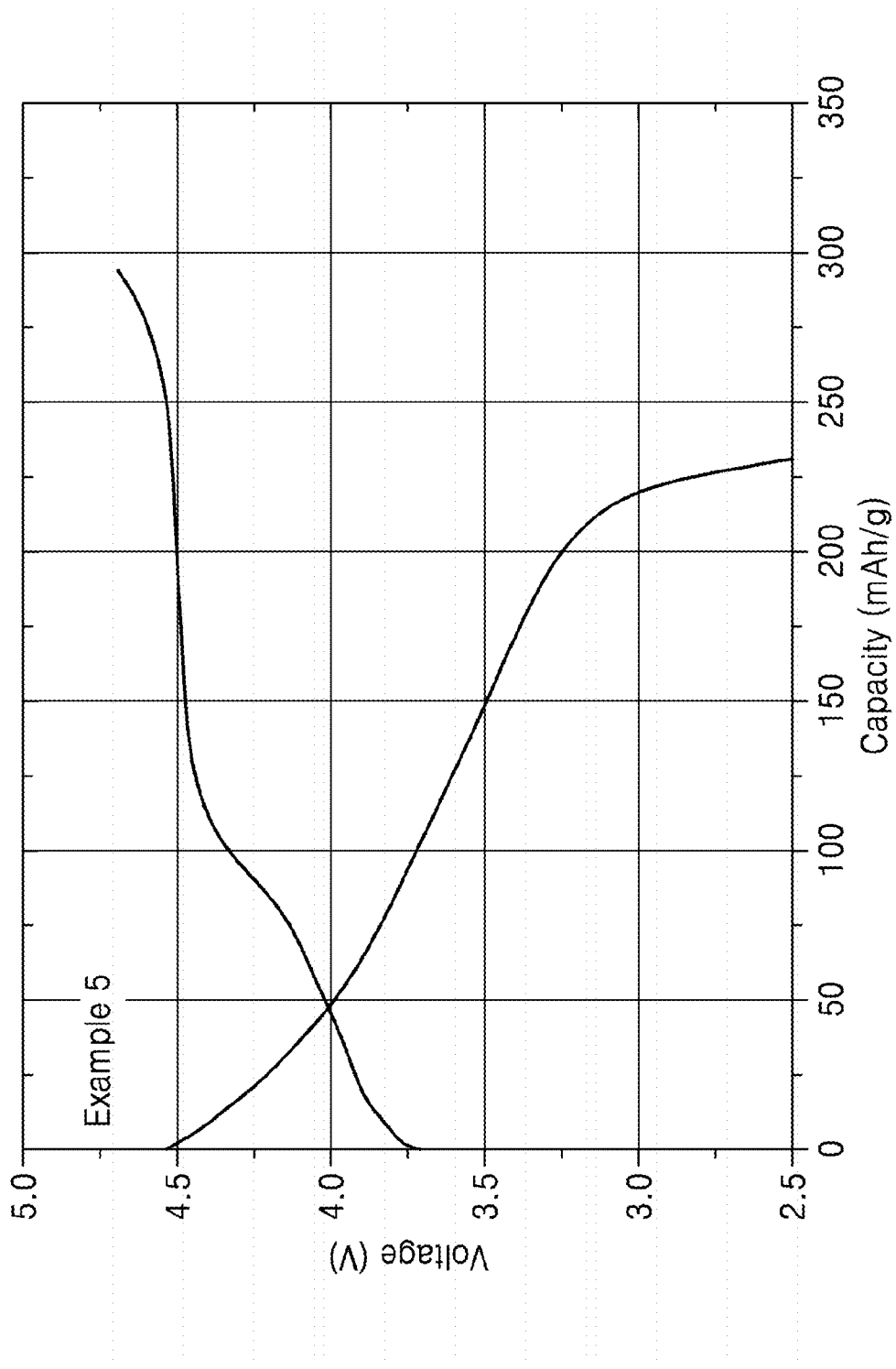
Figure 4C:
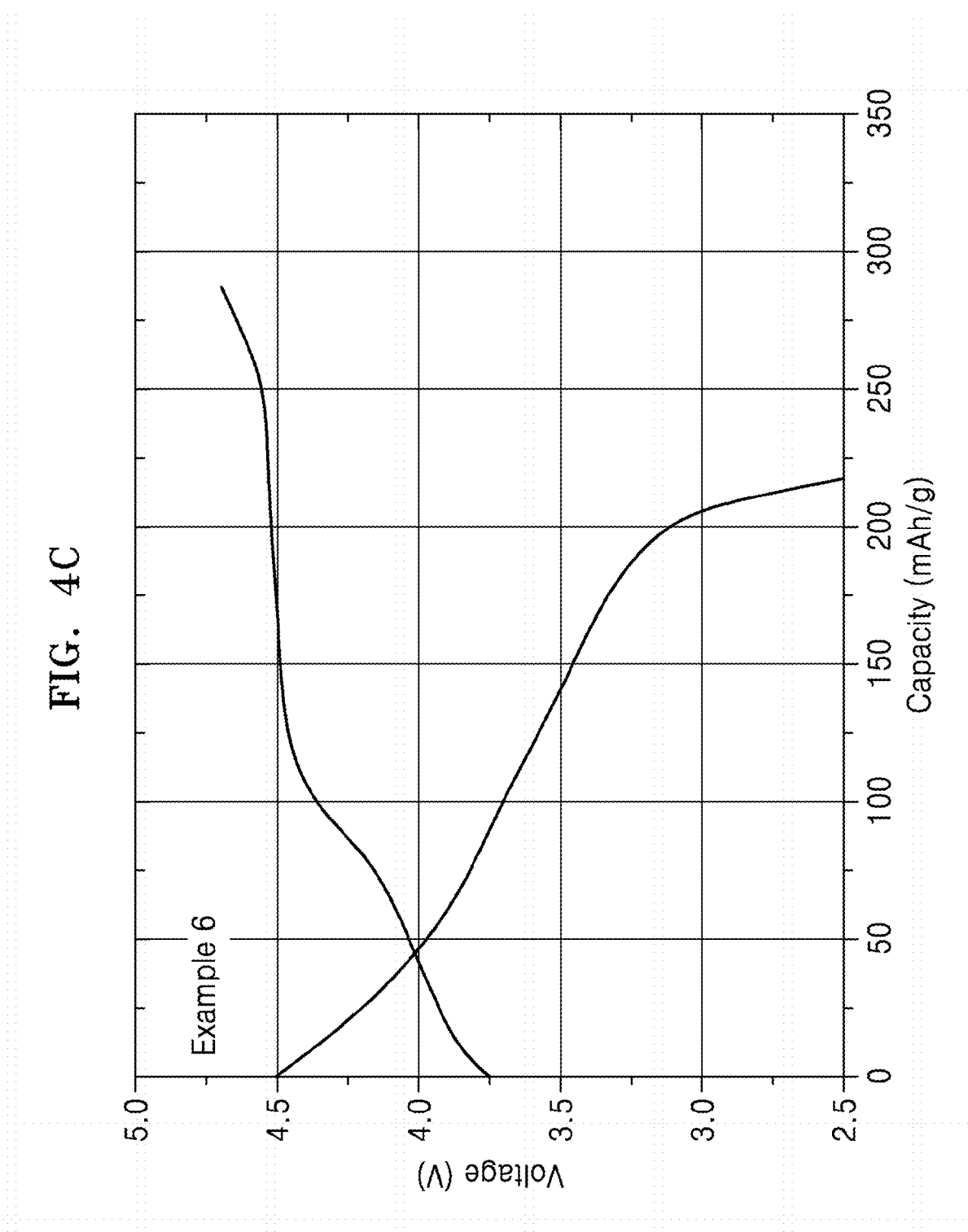

A charging/discharging profile of the first cycle of the lithium batteries prepared in Examples 5 to 7 are shown in FIGS. 4A to 4C. As shown in FIGS. 4A to 4C, a plateau region was obtained at around 4.5 V, and thus activation of $Li_2MnO_3$ was confirmed. That is, presence of an overlithiated oxide (OLO) lithium transition metal oxide having a layer-layer composite crystal structure such as $Li_2MnO_3.Li(Ni,Co,Mn)O_2$ was confirmed.

TABLE 1

|  | Initial discharge capacity [mAh/g] | Capacity retention rate [%] | Voltage drop [mV] |
| --- | --- | --- | --- |
| Example 5 | 218 | 95.2 | −62 |
| Example 6 | 215 | 96.2 | −49 |
| Example 7 | 201 | 97.5 | −29 |
| Comparative Example 3 | 257 | 95.4 | −68 |
| Comparative Example 4 | 226 | 90.9 | −77 |

As shown in Table 1, lithium batteries prepared in Examples 5 to 7 had a high discharge capacity of 200 mAh/g or higher and improved lifetime characteristics compared to those of the lithium batteries prepared in Comparative Examples 3 and 4.

Particularly, voltage drop in the lithium batteries of Examples 5 to 7 decreased compared to those of the lithium batteries of Comparative Examples 3 and 4.

That is, a battery voltage drop during charging/discharging of a conventional OLO lithium transition metal oxide may be significantly decreased by placing at least two different types of metals at a site 12-fold coordinated to oxygen atoms in the metal oxide having a perovskite crystal structure.

As described above, according to the one or more of the above exemplary embodiments, a composite cathode active material may have improved structural stability during charge to high-voltage. When a cathode including the composite cathode active material is used, a lithium battery may have good lifetime characteristics and a decreased voltage drop phenomenon after repeated charging/discharging process.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While an embodiment has been described with reference to the figures, it will be understood by those of ordinary skill in the art that various changes in form and details may be made therein without departing from the spirit and scope as defined by the following claims.

What is claimed is:

1. A composite cathode active material comprising:
a first metal oxide having a layered crystal structure; and
a second metal oxide having a perovskite crystal structure, wherein the second metal oxide comprises a first metal and a second metal that are each 12-fold cuboctahedrally coordinated to oxygen, and wherein the composite cathode active material is a composition represented by Formula 3:

$$x[Li_{2-b}A'_b][M_{1-c}A'_c]O_3 \cdot y[Li_{1-d}A'_d][Me_{1-e}A'_e]O_2 \cdot z[A_{1-a}A'_a]M^1O_3 \quad \text{Formula 3}$$

wherein, in Formula 3,

A is the first metal and is selected from La, Sr, Ba, Ce, Y, and Sc,

A' is the second metal and is selected from Li, Na, Ca, Ag, K, Mg, and Cu, $M^1$ is at least one metal selected from Mn, V, Cr, Fe, Co, Ni, Zr, Ti, Mg, Cu, Nb, Ta, Ru, W, and Sn, M is at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and a rare earth element, Me is at least one metal selected from Mn, V, Cr, Fe, Co, Ni, Zr, Re, Al, B, Ge, Ru, Sn, Ti, Nb, Mo, and Pt $0 < x < 1$, $0 < y < 1$, $0.025 \leq z < 0.1$, and $x+y+z=1$, and $0 < a \leq 0.3$, $0 \leq b < 1$, $0 \leq c < 1$, $0 \leq d < 1$, $0 \leq e < 1$, $0 < a+b+c+d+e < 0.3$, and $0 \leq A'/Li < 0.3$, wherein A'/Li is a ratio of a mole ratio of A' and Li in the composite cathode active material.

2. The composite cathode active material of claim 1, wherein the first metal is selected from elements belonging to Group 2 and Group 3 of the Periodic Table.

3. The composite cathode active material of claim 2, wherein the first metal is selected from La, Sr, Ba, Ce, Y, and Sc.

4. The composite cathode active material of claim 1, wherein the second metal is selected from elements belonging to Group 1 of the Periodic Table.

5. The composite cathode active material of claim 1, wherein the second metal is Na.

6. The composite cathode active material of claim 1, wherein the second metal oxide further comprises a third metal that is 6-fold octahedrally coordinated to oxygen.

7. The composite cathode active material of claim 6, wherein the third metal is selected from elements belonging to Group 4, Group 5, Group, 6, Group 7, Group 8, Group 9, Group 10, Group 11, and Groups 12 to 14.

8. The composite cathode active material of claim 6, wherein the third metal is selected from Mn, V, Cr, Fe, Co, Ni, Zr, Ti, Mg, Cu, Nb, Ta, Ru, W, and Sn.

9. The composite cathode active material of claim 1, wherein the second metal oxide comprises at least one metal oxide selected from $(La_{1-a}Na_a)MnO_3$, $(La_{1-a}Li_a)MnO_3$, $(Ba_{1-a}Na_a)TiO_3$, $(Ba_{1-a}Li_a)TiO_3$, $(La_{1-a}Na_a)NiO_3$, $(La_{1-a}Li_a)NiO_3$, $(La_{1-a}Na_a)CoO_3$, $(La_{1-a}Li_a)CoO_3$, $(La_{1-a}Na_a)MgO_3$, $(La_{1-a}Li_a)MgO_3$, $(La_{1-a}Na_a)FeO_3$, $(La_{1-a}Li_a)FeO_3$, $(Sr_{1-a}Na_a)NiO_3$, $(Sr_{1-a}Li_a)NiO_3$, $(Sr_{1-a}Na_a)CoO_3$, $(Sr_{1-a}Li_a)CoO_3$, $(Sr_{1-a}Na_a)MnO_3$, $(Sr_{1-a}Li_a)MnO_3$, $(Sr_{1-a}Na_a)MgO_3$, $(Sr_{1-a}Li_a)MgO_3$, $(Sr_{1-a}Na_a)FeO_3$, $(Sr_{1-a}Li_a)FeO_3$, $(Ba_{1-a}Na_a)NiO_3$, $(Ba_{1-a}Li_a)NiO_3$, $(Ba_{1-a}Na_a)CoO_3$, $(Ba_{1-a}Li_a)CoO_3$, $(Ba_{1-a}Na_a)MnO_3$, $(Ba_{1-a}Li_a)MnO_3$, $(Ba_{1-a}Na_a)MgO_3$, $(Ba_{1-a}Li_a)MgO_3$, $(Ba_{1-a}Na_a)FeO_3$, $(Ba_{1-a}Li_a)FeO_3$, $(Ca_{1-a}Na_a)NiO_3$, $(Ca_{1-a}Li_a)NiO_3$, $(Ca_{1-a}Na_a)CoO_3$, $(Ca_{1-a}Li_a)CoO_3$, $(Ca_{1-a}Na_a)MnO_3$, $(Ca_{1-a}Li_a)MnO_3$, $(Ca_{1-a}Na_a)MgO_3$, $(Ca_{1-a}Li_a)MgO_3$, $(Ca_{1-a}Na_a)FeO_3$, and $(Ca_{1-a}Li_a)FeO_3$, wherein, in the metal oxides, $0 < a \leq 0.3$.

10. The composite cathode active material of claim 1, wherein the first metal oxide comprises a plurality of crystal phases, and wherein a first crystal phase and a second crystal phase of the plurality of crystal phases have different compositions.

11. The composite cathode active material of claim 10, wherein composite cathode active material comprises a composite phase comprising the plurality of crystal phases.

12. The composite cathode active material of claim 1, wherein the composite cathode active material comprises a composite of the first metal oxide and the second metal oxide.

13. The composite cathode active material of claim 1, wherein the second metal oxide is intermixed in the layered crystal structure of the first metal oxide.

14. The composite cathode active material of claim 1 having a composition represented by Formula 4:

$$x[Li_{2-b}A'_b][Mn_{1-c}A'_c]O_3 \cdot y[Li_{1-d}A'_d][(Ni_pCo_qMn_r)_{1-e}A'_e]O_2 \cdot z[La_{1-a}A'_a]MnO_3 \quad \text{Formula 4}$$

wherein, in Formula 4,

A' is a metal selected from Li, Na, Ca, Ag, K, Mg, and Cu, $0 < x < 1$, $0 < y < 1$, $0.025 \leq z < 0.1$, and $x+y+z=1$, $0 < p < 1$, $0 < q < 1$, $0 < r < 1$, and $p+q+r=1$, and $0 < a \leq 0.3$, $0 \leq b < 1$, $0 \leq c < 1$, $0 \leq d < 1$, $0 \leq e < 1$, $0 < a+b+c+d+e < 0.3$, and $0 \leq A'/Li < 0.3$, wherein A'/Li is a ratio of a mole ratio of A' and Li in the composite cathode active material.

15. The composite cathode active material of claim 1 having a composition represented by Formula 5:

$$x[Li_{2-b}Na_b][Mn_{1-c}Na_c]O_3 \cdot y[Li_{1-d}Na_d][(Ni_pCo_qMn_r)_{1-e}Na_e]O_2 \cdot z[La_{1-a}Na_a]MnO_3 \quad \text{Formula 5}$$

wherein, in Formula 5, $0 < x < 1$, $0 < y < 1$, $0.025 \leq z < 0.1$, and $x+y+z=1$, $0 < p < 1$, $0 < q < 1$, $0 < r < 1$, and $p+q+r=1$, and $0 < a \leq 0.3$, $0 \leq b < 1$, $0 \leq c < 1$, $0 \leq d < 1$, $0 \leq e < 1$, $0 < a+b+c+d+e < 0.3$, and $0 \leq Na/Li < 0.3$, wherein Na/Li is a ratio of a mole ratio of Na and Li in the composite cathode active material.

16. A cathode comprising the composite cathode active material of claim 1.

17. A lithium battery comprising the cathode of claim 16.

* * * * *